United States Patent [19]
Zook et al.

[11] Patent Number: 5,142,422
[45] Date of Patent: Aug. 25, 1992

[54] DUAL CHANNEL HELICAL RECORDER

[75] Inventors: Christopher P. Zook, Lafayette; Robert Bordasch; Steven P. Georgis, both of Boulder; Alireza Atai-Azimi, Westminister; Christopher Pisciotta, Lafayette; Steve E. Haughland, Longmount; Timothy C. Hughes, Lafayette, all of Colo.

[73] Assignee: Exabyte Corporation, Boulder, Colo.

[21] Appl. No.: 670,404

[22] Filed: Mar. 15, 1991

Related U.S. Application Data

[63] Continuation of Ser. No. 433,961, Nov. 9, 1989, abandoned.

[51] Int. Cl.⁵ .................... G11B 5/09; G11B 15/14
[52] U.S. Cl. .......................... 360/54; 360/53; 360/64
[58] Field of Search ............... 360/64, 22, 32, 53, 360/54

[56] References Cited

U.S. PATENT DOCUMENTS

| | | | |
|---|---|---|---|
| 4,011,587 | 3/1977 | Arter et al. ............ | 360/64 |
| 4,390,915 | 6/1983 | Matsuyama ............ | 360/104 |
| 4,467,373 | 8/1984 | Taylor et al. .......... | 360/38.1 |
| 4,492,991 | 1/1985 | Osada et al. .......... | 360/74.4 |
| 4,609,947 | 9/1986 | Yamagiwa ............ | 358/310 |
| 4,636,873 | 1/1987 | Eguchi .................. | 360/64 |
| 4,637,023 | 1/1987 | Lunsbury et al. ..... | 371/38 |
| 4,717,974 | 1/1988 | Baumeister ............ | 360/64 |
| 4,737,865 | 4/1988 | Murakami ............. | 360/14.1 |
| 4,758,911 | 7/1988 | Nakano ................. | 360/64 |
| 4,835,628 | 5/1989 | Hinz ..................... | 360/48 |
| 4,843,495 | 6/1989 | Georgis ................. | 360/77.15 |
| 4,845,577 | 7/1989 | Georgis ................. | 360/72.2 |
| 4,897,739 | 1/1990 | Hasegawa et al. ..... | 360/64 |

Primary Examiner—Aristotelis Psitos
Assistant Examiner—Varsha V. Sheladia
Attorney, Agent, or Firm—Nixon & Vanderhye

[57] ABSTRACT

A dual channel helical scan recording system (30) includes a rotating dum (36) having sets of heads (W1, W2) (R1, R2) mounted on its peripheral surface (56). A set of write heads (W1, W2) is situated on an opposite side of the drum (36) from a set of read heads (R1, R2). The write heads (W1, W2) simultaneously write two adjacent tracks (T1, T2), which are read for verification 180 detrees later by corresponding read heads (R1, R2). The heads (W1, W2, R1, R2) are strategically mounted on the drum (36) with respect to angular and axial placement, and have selected head widths and azimuthal angles. Should a block of data (317) written to tape (32) be determined, during readback, to be bad block, that bad block is subsequently rewritten on the tape (32) in the course of writing good blocks and amongst other good blocks. The rewritten block is recorded at a row position on the tape which is sufficiently displaced from the row position of a previous writing to avoid media defects occuring on the tape. In addition, a block written by a first write head (W1) and perceived as having been written as a bad block must be written by a second write head (W2) before that block is rewritten a predetermined number of times.

25 Claims, 11 Drawing Sheets

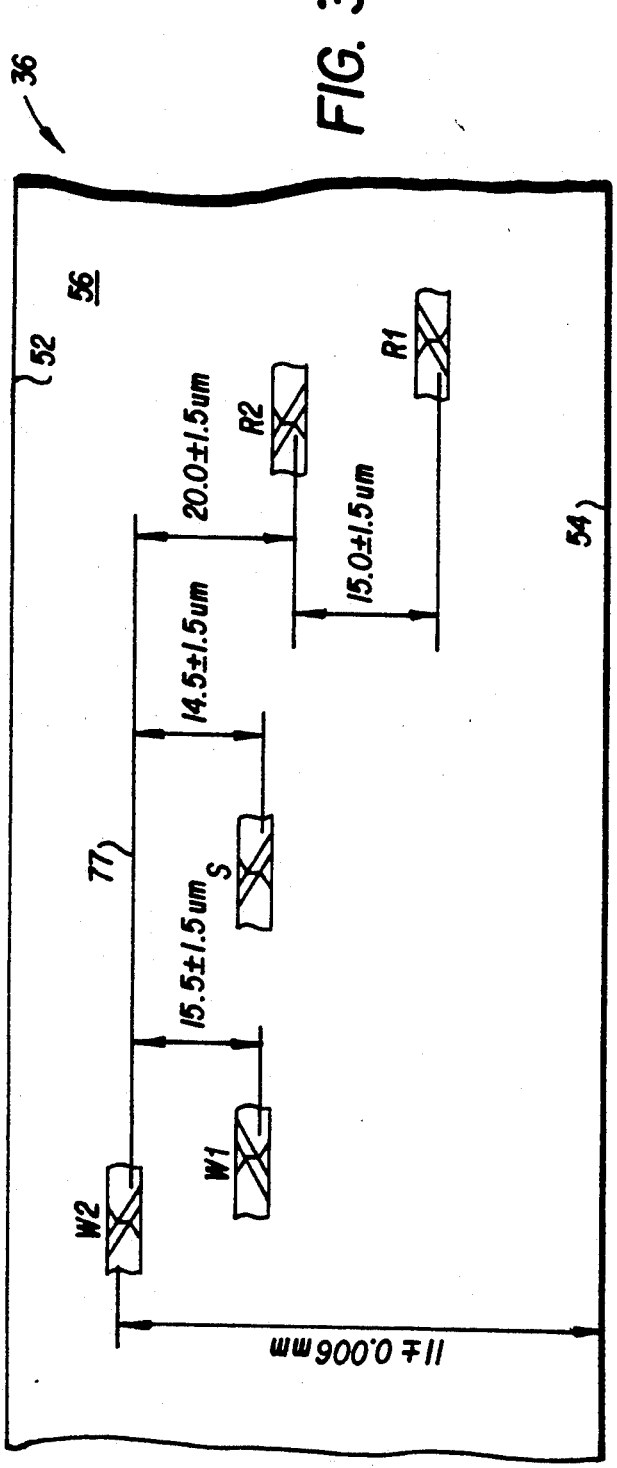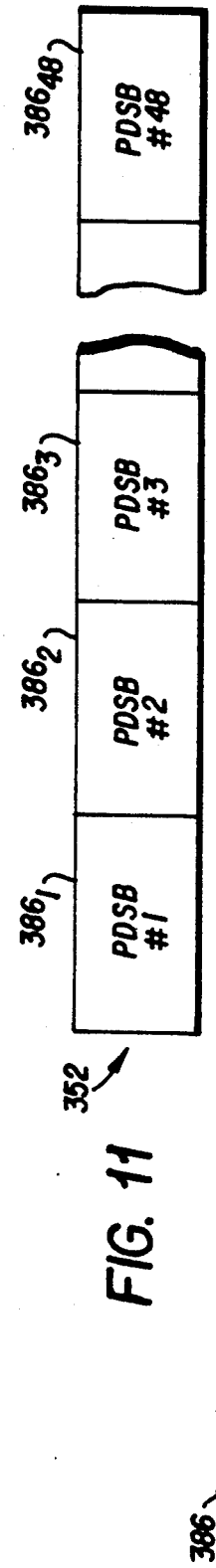

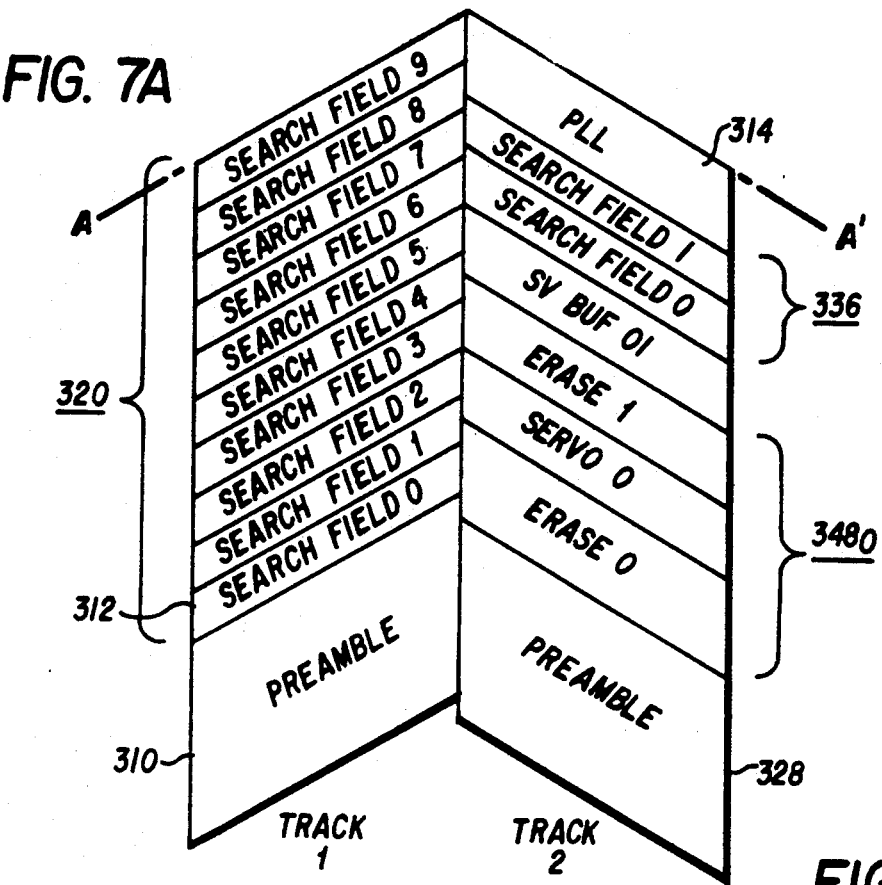

| BIT BYTE | 7 | 6 | 5 | 4 | 3 | 2 | 1 | 0 |
|---|---|---|---|---|---|---|---|---|
| 0 | RESERVED | | LBLK# LSB | | LAST | END | LENGTH (HI) | |
| 1 | LENGTH (LO) | | | | | | | |

| BIT BYTE | 7 | 6 | 5 | 4 | 3 | 2 | 1 | 0 |
|---|---|---|---|---|---|---|---|---|
| 00 | (MSB) | | | | | | | |
| 01 | BYTE SYNC | | | | | | | (LSB) |
| 02 | SF SYNC ID | | | | | | | |
| 03 | RESERVED | | | | | | | |
| 04 | RESERVED | | | | | | | |
| 05 | (MSB) | | | | | | | |
| 06 | FILE NUMBER | | | | | | | |
| 07 | | | | | | | | (LSB) |
| 08 | (MSB) | | | | | | | |
| 09 | LOGICAL BLOCK ID | | | | | | | |
| 0A | | | | | | | | |
| 0B | | | | | | | | (LSB) |
| 0C | (MSB) | | | | | | | |
| 0D | PHYSICAL BLOCK ID | | | | | | | |
| 0E | | | | | | | | |
| 0F | | | | | | | | (LSB) |
| 10 | PARTITION NUMBER | | | | | | | |
| 11 | EDOM | | RESERVED | | | | | |
| 12 | (MSB) | | | | | | | |
| 13 | BLOCK ID | | | | | | | |
| 14 | | | | | | | | |
| 15 | | | | | | | | (LSB) |
| 16 | RESERVED | | | | | | | |
| 17 | RESERVED | | | | | | | |
| 18 | RESERVED | | | | | | | |
| 19 | RESERVED | | | | | | | |
| 1A | (MSB) | | | | | | | |
| 1B | CRC | | | | | | | (LSB) |

DUAL CHANNEL HELICAL RECORDER

This is a continuation/division of application Ser. No. 07/433,961, filed Nov. 9, 1989 now abandoned.

BACKGROUND

1. Field of Invention

This invention pertains to method and apparatus for recording and reading information stored in helical stripes on magnetic tape, and particularly to method and apparatus for using dual channels to record and read information stored in helical stripes on magnetic tape.

2. Prior Art and Other Considerations

Numerous prior art patents teach the recording and reading of information stored in helical stripes on magnetic tape. In a helical scan arrangement, travelling magnetic tape is partially wrapped around a rotating drum so that heads positioned on the drum are contiguous to the drum as the drum is rotated. A write head on the drum physically records data on the tape in a series of discrete stripes oriented at an angle with respect to the direction of tape travel. The data is formatted, prior to recording on the tape, to provide sufficient referencing information to enable later recovery during readout.

Among such prior art teachings are the following United State's Patents, all commonly assigned herewith and incorporated herein by reference:

(1) U.S. Pat. No. 4,843,495 to Georgis et al., entitled CYCLICAL SERVO ZONE TRACKING METHOD AND APPARATUS FOR HELICAL SCAN RECORDING DEVICES;

(2) U.S. Pat. No. 4,835,638 to Hinz et al., entitled APPARATUS AND METHOD FOR FORMATTING AND RECORDING DIGITAL DATA ON MAGNETIC TAPE; and, (3) U.S. Pat. No. 4,845,577 to Georgis et al., entitled APPARATUS AND METHOD FOR ENABLING RAPID SEARCHING OF HELICALLY RECORDED MAGNETIC TAPE.

Existing helical scan systems employ a single channel read/write configuration on the rotating drum, where the drum has a write head and a read head mounted 180 degrees apart. On each rotation of the drum, the first head writes the data track and the second head performs a read-back check to verify the written data. The write and read functions must occur exclusively due to the problems of crosstalk in the rotating drum and an associated rotary transformer. Existing single channel helical scan systems thus have a limited rate ("data transfer rate") at which information can be written and read.

Accordingly, it is an object of the present invention to provide an helical scan system which enhances the data transfer rate of a digital helical scan recorder.

An advantage of the present invention is the provision of a helical scan system which allows the capacity of a given length of tape to be increased by decreasing the track pitch.

A further advantage of the present invention is the provision of a helical scan system which is compatible with a single channel system.

Yet another advantage of the present invention is the provision of a helical scan system which does not suffer from crosstalk problems.

SUMMARY

A dual channel helical scan recording system includes a rotating drum having two sets of heads mounted on its peripheral surface. A set of write heads is situated on an opposite side of the drum from a set of read heads. The write heads simultaneously write two adjacent tracks or stripes of information, which are read for verification 180 degrees later by corresponding read heads. The heads are strategically mounted on the drum with respect to angular and axial placement, and have selected head widths and azimuthal angles.

The peripheral surface of the drum follows a peripheral path which includes a medium contact path portion whereat the drum periphery is contiguous to the storage medium being transported therepast. In the preferred embodiment, the storage medium is 8 mm magnetic tape.

A head signal, HEAD SYNC, is generated to have a high value when the set of read heads is travelling in the medium contact path and a low value when the set of write heads is travelling in the medium contact tape. That is, the head signal has a low value during the first 180 degrees of drum rotation, i.e., when the write heads are over the storage medium. The head signal has a high value during the second 180 degrees of drum rotation, i.e., when the read heads are over the storage medium.

The dual channel recorder includes a data buffer for storing data to be written on the tape and an encoder/formatter for receiving data from the buffer and formatting the data in preparation for writing the data on the tape. The encoder/formatter receives and formats a first segment of data when the head signal is high, and receives and formats a second segment of data when the head signal is low. The first segment of data formatted when the head signal is high is stored in a FIFO register. Write circuits associated with a first write head and a second write head respectively receive the first segment of data from the FIFO register and the second segment of data from the encoder/formatter, and simultaneously write the first and second segments of data as respective first and second helical stripes.

The encoding/formatter formats data in the form of blocks, with a predetermined number (8) of blocks being formatted into the first segment of data and the same predetermined number of blocks being formatted into the second segment of data. In this respect, the data buffer includes an output queue wherein numbers for data blocks awaiting output to the encoder/formatter, and hence to the write heads, are entered.

Should a block written to tape be determined, during readback, to be a bad block, that bad block is subsequently rewritten on the tape in the course of writing good blocks and amongst other good blocks, but at a row position on the tape which is displaced from the row position of a previous writing sufficiently to avoid media defects occurring on the tape. The rewriting of a block in this manner is accomplished by retaining the block number of the bad block in the read queue, with the read queue being a circular memory having a predetermined size of 19 elements. In addition, a block written by a first write head and perceived as having been written as a bad block must be written by a second write head before that block is rewritten a predetermined number of times.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view depicting in planar fashion a peripheral surface of a drum of the helical scan system of the embodiment of FIG. 1.

FIG. 9 is a schematic view depicting the format of a physical block header of a physical data block included on a stripe of magnetic tape recorded by or readable by the helical scan system of the embodiment of FIG. 1.

FIG. 10 is a schematic view depicting the format of a logical block header included on a stripe of magnetic tape recorded by or readable by the helical scan system of the embodiment of FIG. 1.

FIG. 11 is a schematic view depicting the format of a data area including a plurality of data sub-blocks recorded by or readable by the helical scan system of the embodiment of FIG. 1.

FIG. 12 is a schematic view depicting the format of a data sub-block recorded by or readable by the helical scan system of the embodiment of FIG. 1.

FIG. 13 is a schematic view depicting the format of a search field included on a stripe of magnetic tape recorded by or readable by the helical scan system of the embodiment of FIG. 1.

DETAILED DESCRIPTION OF THE DRAWINGS

Figure 1:
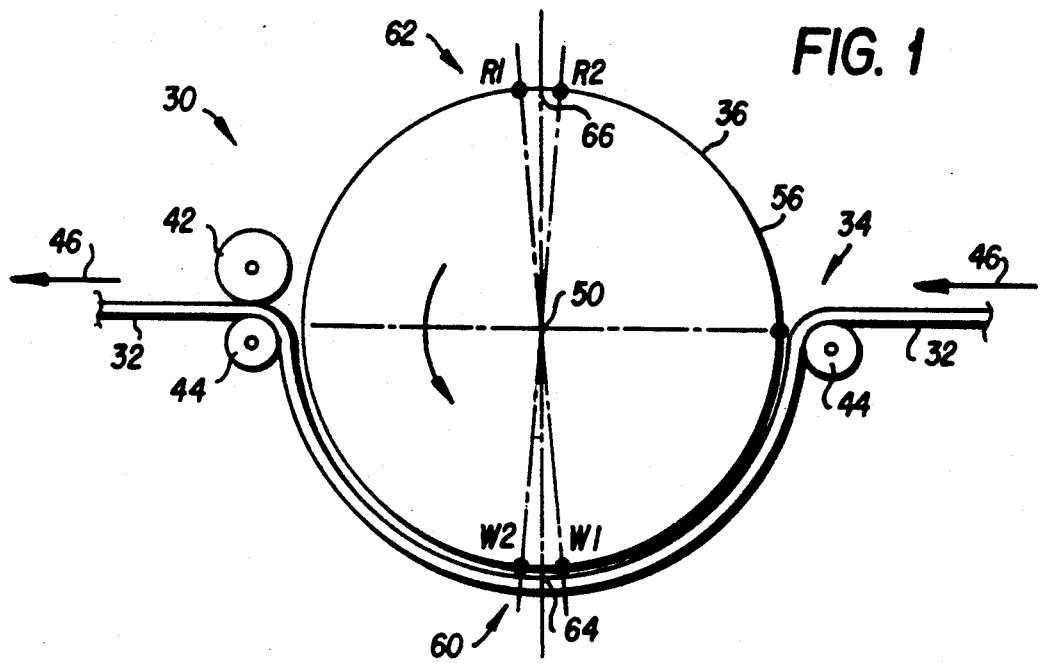
FIG. 1 is a schematic view of head placement on a drum of a helical scan system of an embodiment of the invention.

FIG. 1 shows drum and transport portions of a helical scan system 30 for recording digital information on magnetic tape 32. The helical scan system 30 includes a tape transport 34 and a rotating drum 36.

The tape transport 34 includes a capstan 42 and two tape guides 44. In conventional manner, the capstan 42 is rotated by an unillustrated capstan drive motor in order to move the tape 32 in a direction of tape travel indicated by arrows 46. In the illustrated embodiment, the capstan 42 rotates to transport the tape 32 at a speed on the order of about one-half inch per second.

DRUM AND HEAD STRUCTURE

Figure 2:
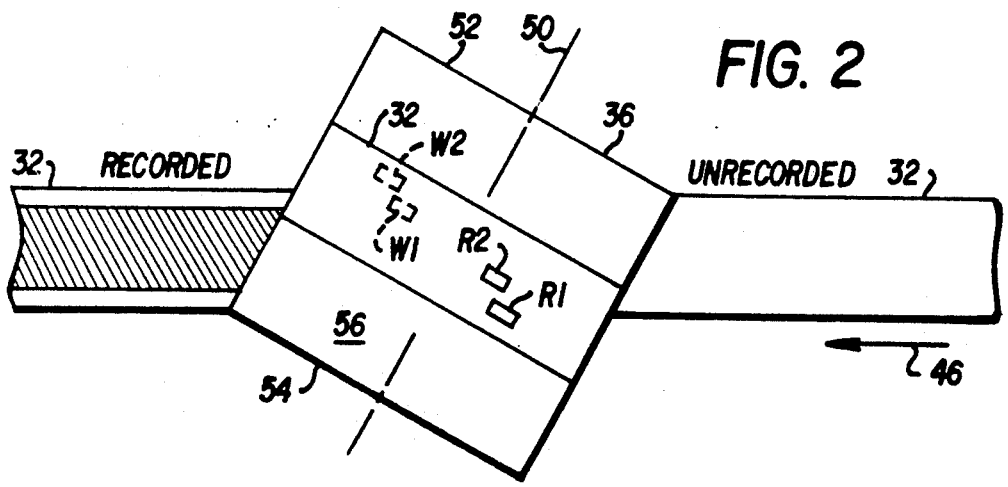
FIG. 2 is a schematic view of the helical scan system of the embodiment of FIG. 1 recording stripes on magnetic tape.

The drum 36 is rotatable about drum axis 50. The drum is rotated at a velocity of about 1800 rpm by an unillustrated drum motor. An unillustrated tachometer detects rotations of the drum motor shaft, and hence of the drum, and produces a DRUM SYNC signal. As shown in FIG. 2, drum axis 50, and hence drum 36, is angularly oriented with respect to the edges and direction of travel of the tape 32. The drum 36 has a drum upper surface 52 and a drum lower surface 54, both of which are planar. The drum axis 50 is orthogonal to both the drum upper surface 52 and the drum lower surface 54. The drum 36 also has a peripheral surface 56 which wraps around the circumference of the drum 36.

The peripheral surface 56 of the drum 36 has two sets of heads mounted thereon, in particular a first set of heads comprising write heads W1 and W2 and a second set of heads comprising read heads R1 and R2. In addition, the peripheral surface 56 of the drum 36 has a servo head S mounted thereon.

Figure 6:
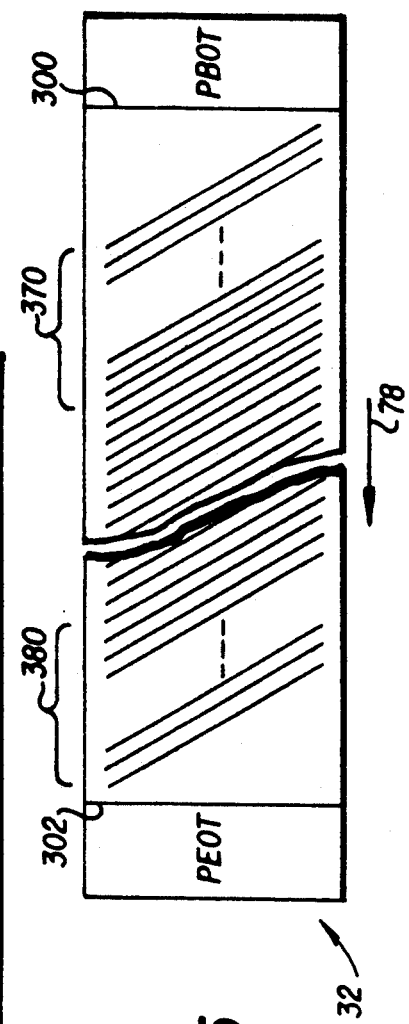
FIG. 6 is a schematic view of a plurality of stripes recorded on magnetic tape by the helical scan system of the embodiment of FIG. 1, and further showing paths of travel of heads provided on the drum of the helical scan the embodiment of FIG. 1.

The heads W1, W2, R1, and R2 are mounted to generate helical stripes on the magnetic tape 32 in the manner shown in FIG. 6. Heads W1 and W2 essentially simultaneously write first and second tracks of data, i.e., tracks T1 and T2, respectively, on the tape 32. Heads R1 and R2 are positioned to read tracks T1 and T2, respectively, 180 degrees after the tracks T1 and T2 are written. In this respect, although FIG. 6 shows write heads W1, W2 and read heads R1, R2 traveling over tracks T1 and T2 for the sake of depicting head placement relative to the tracks, it should be understood the read heads R1, R2 and the write heads W1, W2 cannot simultaneously be over the tracks in the manner depicted in FIG. 6. Likewise, the inclusion of the servo head S in FIG. 6 is merely to show the position of the servo head S relative to the tracks T1 and T2, and not in relationship to the read heads R1, R2 or the write heads R1, R2.

In the above regard, four geometrical factors regarding the heads are strategic to enable the simultaneous writing by heads W1 and W2 and the subsequent respective reading by corresponding heads R1 and R2; the angular separation of the heads about the drum peripheral surface 56; the axial location of the heads on the drum peripheral surface 56; the width of the heads; and, the azimuthal orientation of the heads. With respect to the angular positioning of the heads, the first set of heads (W1, W2) is in a first neighborhood 60 of the peripheral surface 56; the second set of heads (R1, R2) is in a second neighborhood 62 of the peripheral surface 56. As used herein, the term "neighborhood" means a region of the peripheral surface 56 of the drum that extends angularly less than 5 degrees with respect to the drum axis 50, and which extends axially less than 1 mm.

Each neighborhood 60, 62 has an angular center, which is depicted by line 64 for neighborhood 60 and line 66 for neighborhood 62. Each head is angularly spaced less than one degree from the angular center of its neighborhood. As shown in FIG. 1, the center line 64 of neighborhood 60 [the neighborhood of the first set of heads (W1, W2)] is angularly separated or spaced away, with respect to the drum axis 50, from the center line 66 of neighborhood 62 [the neighborhood of the second set of heads (R1, R2)] by about 180 degrees. Moreover, with respect to the drum axis 50, head W1 and head R1 are angularly separated by about 180 degrees, and head W2 and head R2 are angularly separated by about 180 degrees. The servo head S is angularly positioned half way between the center lines 64, 66 of the two neighborhoods 60, 62, respectively.

Each head W1, W2, R1, and R2 is precisely located with respect to one another in an axial sense (i.e., relative to the drum axis 50). As shown in FIG. 3, each head W1, W2, R1, and R2 is precisely located with respect to the drum lower surface 54. Table 1 shows the axial displacement or distance (in micrometers) separating each of the heads from plane 77. In this regard, FIG. 3 shows a plane 77 passing through the drum at the center of head W2, with the plane 77 being perpendicular to the drum axis 50. It is understood that head W2 is centered at plane 77, and therefore not listed in Table 1.

TABLE 1

| HEAD DISTANCES | |
|---|---|
| head | axial length |
| R1 | 35.0 |
| R2 | 20.0 |
| W1 | 15.5 |
| S | 15.0 |

It should be understood, that given systems having a different sized scaling, the values for the distances provided in Table 1 differ, with those values being dependent upon track pitch, drum rotation speed, and linear tape speed.

The width of the heads (in micrometers) and the azimuthal angles (in degrees) of the heads are listed on Table 2.

TABLE 2

| HEAD CHARACTERISTICS | | |
|---|---|---|
| head | azimuth | width (micrometers) |
| R1 | +20 | 24 plus or minus 2 |
| R2 | −10 | 25 plus or minus 3 |
| S | −10 | 29.5 plus or minus 2 |
| W1 | +20 | 24 plus or minus 3 |
| W2 | −10 | 25 plus or minus 2 |

FIG. 6 shows a plurality of helical stripes recorded on magnetic tape 32 by the helical scan system 30, and the ultimate paths of travel of the heads W1, W2, R1, and R2, as well as the servo head S over the helical stripes. The direction of movement of the heads is depicted by arrow 78 in FIG. 6.

Thus it is seen that a dual channel helical scan system 20 is provided, with a first channel including the heads W1 and R1, and a second channel including the heads W2 and R2. The employment of two channels effectively doubles the data transfer rate, since twice as many tracks are written to tape per revolution of the drum 36. For checking purposes, the heads R1 and R2 read back the two simultaneously written tracks approximately 180 degrees after the tracks are written. The write and read functions occur exclusively, thereby eliminating any crosstalk problems.

SYSTEM STRUCTURE

Figure 4:
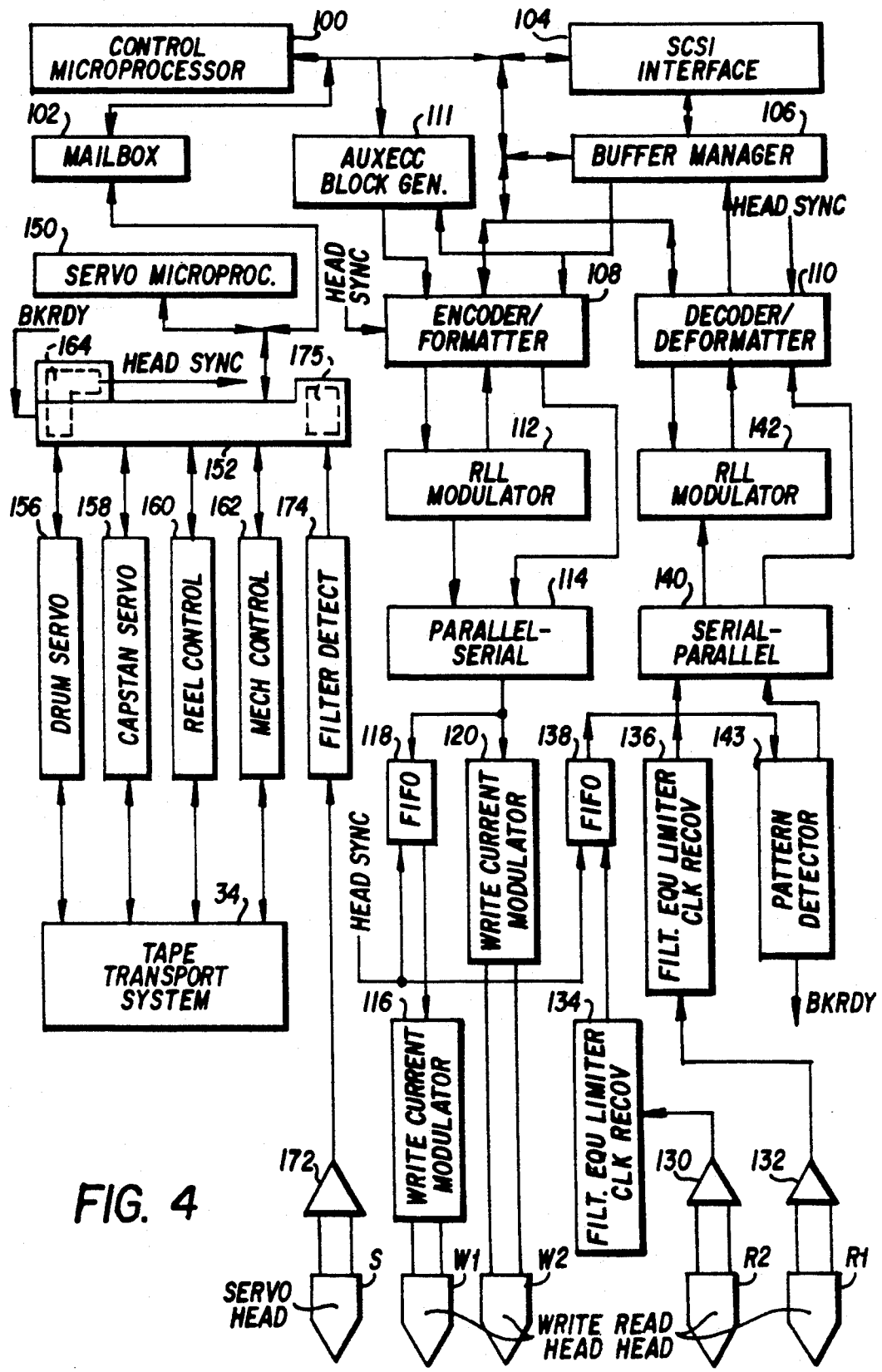
FIG. 4 is a schematic view of the helical scan system facilitating the head placement on a drum according to the embodiment of FIG. 1.

FIG. 4 illustrates the overall helical scan system 30, including the read heads R1, R2, the write heads W1,W2, and the servo head S. The helical scan system 30 further includes a control microprocessor 100 which communicates primarily with a mailbox 102; a SCSI interface 104; a data buffer manager 106; an encoder/formatter 108; a decoder/de-formatter 110; and, an AUXECC block generator 111.

The data buffer 106 manager comprises a data buffer which includes 1 MByte of DRAM is organized as a 9-bit wide, dual-port, circular memory. Data transfers between the data buffer manager 106 and the SCSI interface 104, the encoder/formatter 108, the decoder/deformatter 110, and the AUXECC block generator 111 occur asynchronously or synchronously. Logical user data blocks are formatted into physical blocks in the data buffer 106 for recording onto tape.

The AUXECC block generator 111 produces auxiliary error correction blocks for recording error correction stripes on the tape 32. The structure and operation of the AUXECC block generator is described in simultaneously-filed U.S. patent application Ser. No. 07/434,009 ERROR APPLICATION METHOD AND APPARATUS, which is incorporated herein by reference.

The encoder/formatter 108 receives data blocks from the data buffer manager 106 and from the AUXECC block generator 111. The encoder/formatter 108 performs a variety of functions, including appending error correction code (ECC) information, inserting synchronization markers, inserting search fields, and inserting servo fields and performing interleave sequencing of bytes. The encoder/formatter 108 transmits the data blocks and appended information to a RLL Modulator 112 which performs the run-length encoding of the data stream by translating each 8 bit byte to a 10-bit word. The 10-bit word is then transmitted to a bit serializer 114. The bit serializer 114 is connected to a write driver circuit 116 (for write head W1) through a FIFO register 118, and to a write driver circuit 120 (for write head W2). The function of the FIFO register 118 will be explained below in connection with the description of the write operation of the helical scan system 30.

The read heads R2 and R1 are connected to preamplifiers 130 and 132, respectively, for amplifying a read signal. The preamplifiers 130 and 132 are connected to signal conditioning circuits 134 and 136, respectively. The signal conditioning circuits 134 and 136 include circuits for amplitude sensing, equalization, and data clocking and detection.

The signal conditioning circuit 134 is connected to FIFO register 138, which in turn is connected to a serial-to-parallel converter 140. The signal conditioning circuit 136 is connected directly to the serial-to-parallel converter 140.

The serial-to-parallel converter 140 is connected to an RLL De-Modulator 142 and to a pattern detector circuit 143. The RLL De-Modulator basically performs the inverse operations of the corresponding RLL Write Modulator 112.

The pattern detector 143 monitors the incoming stream of data in order to recognize a synchronization field. When the pattern detector 143 has recognized a predetermined number of synchronization fields having a predetermined spacing, the pattern detector 143 generates a BKRDY signal. In addition, the pattern detector 143 supplies to the serial-parallel converter 140 synchronizing signals necessary for the operation of the converter 140.

The RLL De-Modulator 142 is connected to the decoder/de-formatter 110. The decoder/de-formatter 110 assembles data blocks and performs error correction.

The microprocessor 100 communicates through its mailbox 102 with a servo microprocessor 150 and a motion control system 152. The motion control system 152 includes a dedicated microprocessor for communicating with a drum servo 156; a capstan servo 158; reel control circuits 160; and a mechanical controller 162. In addition, upon receipt of the BKRDY signal generated by the pattern detector 143, the motion control system 152 includes circuitry, herein called HEAD SYNC generator 164, for developing a HEAD SYNC signal. The HEAD SYNC generator 164 is described in simultaneously-filed U.S. patent application Ser. No. 07/434,008 entitled METHOD AND APPARATUS FOR SYNCHRONIZING TIMING SIGNALS, which is incorporated herein by reference. The HEAD SYNC signal is high when the read heads R1 and R2 are over the helical stripes of Track 1 and Track 2. The HEAD SYNC signal is low when the write heads W1 and W2 are over the stripes of Track 1 and Track 2.

The motion control system 152 also communicates with sensor interface circuits for the various unillustrated elements: including the following: a drum tachometer; a capstan tachometer; a reel tachometer; an end of tape (EOT) detector; and, a beginning of tape (BOT) detector. As shown in FIG. 4, the tape transport system 34 is connected to the drum servo 156, the capstan servo 158, the reel control 160, and the mechanical controller 162.

The servo head S has its output signal connected to preamplifier 172. The output of the servo preamplifier 172 is applied to a filter and detection circuit 174 which filters the amplified signal and for detecting the servo signals recorded on tape. The filter and detection circuit 174 is in turn connected to a servo tracking circuit 175 included in the motion control system 152. The details of servo tracking circuit 175 are shown in simultaneously-filed U.S. patent application Ser. No. 07/433,977 entitled SERVO TRACKING FOR HELICAL SCAN RECORDER, which is incorporated herein by reference.

TAPE FORMAT

Figure 5:
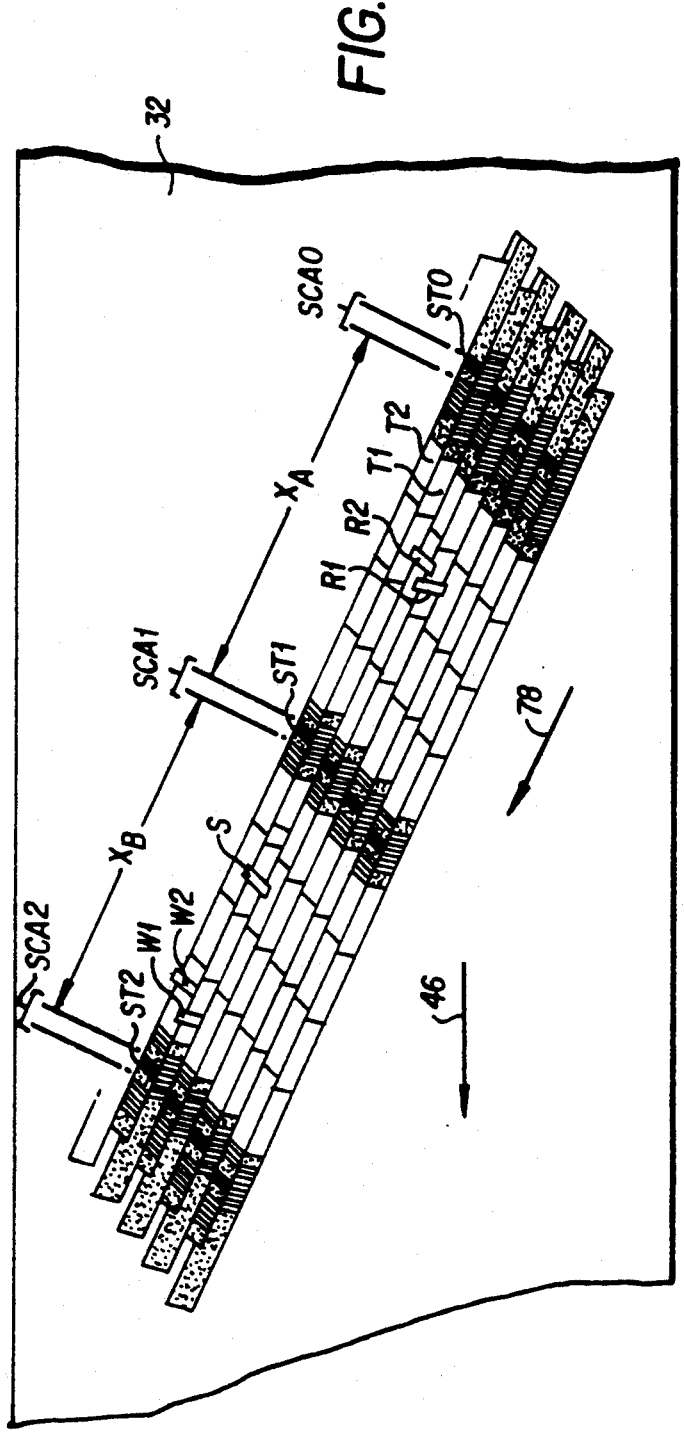
FIG. 5 is a schematic view depicting the format of a magnetic tape recorded by or readable by the helical scan system of the embodiment of FIG. 1.

FIG. 5 depicts the format of magnetic tape 32 for the helical scan system 30. The tape 32 has a physical beginning of tape (PBOT) 300 located at the point where a translucent leader material is attached to the magnetic media. Downstream from the PBOT 300 (in the sense of direction of tape transport as shown by arrow 78) are a multitude of helical stripes formed on the magnetic tape media. The helical stripes contain, of course, the information written by the write heads W1 and W2 and read by the read heads R1 and R2. The format of the helical stripes is discussed subsequently in connection with FIGS. 6 and 7. At the end of the tape 32 is a physical end of tape (PEOT) 302.

Since the helical scan system 30 is a dual azimuthal system, in a write mode odd numbered helical stripes are written at a first azimuthal angle A1 by write head W1 and even numbered helical stripes are written at a second azimuthal angle A2. In a read or readback mode, odd numbered helical stripes are read at a first azimuthal angle A1 by write head W1 and even numbered helical stripes are read at a second azimuthal angle A2. As can be discerned from the foregoing, the first azimuthal angle A1 is +20 degrees; the second any helical stripe written by write head W1 or read by read head R1 is referred to as "Track 1". Likewise, any helical stripe written by write head W2 or read by read head R2 is referred to as "Track 2".

Table 3 shows various recording parameters and parameters for the magnetic tape 32 for the helical scan system 30. Since the helical scan system 30 can operate in either a dual channel or single channel mode, values for both modes are provided in Table 3.

TAPE FORMAT: TRACK 1

Figure 7B:
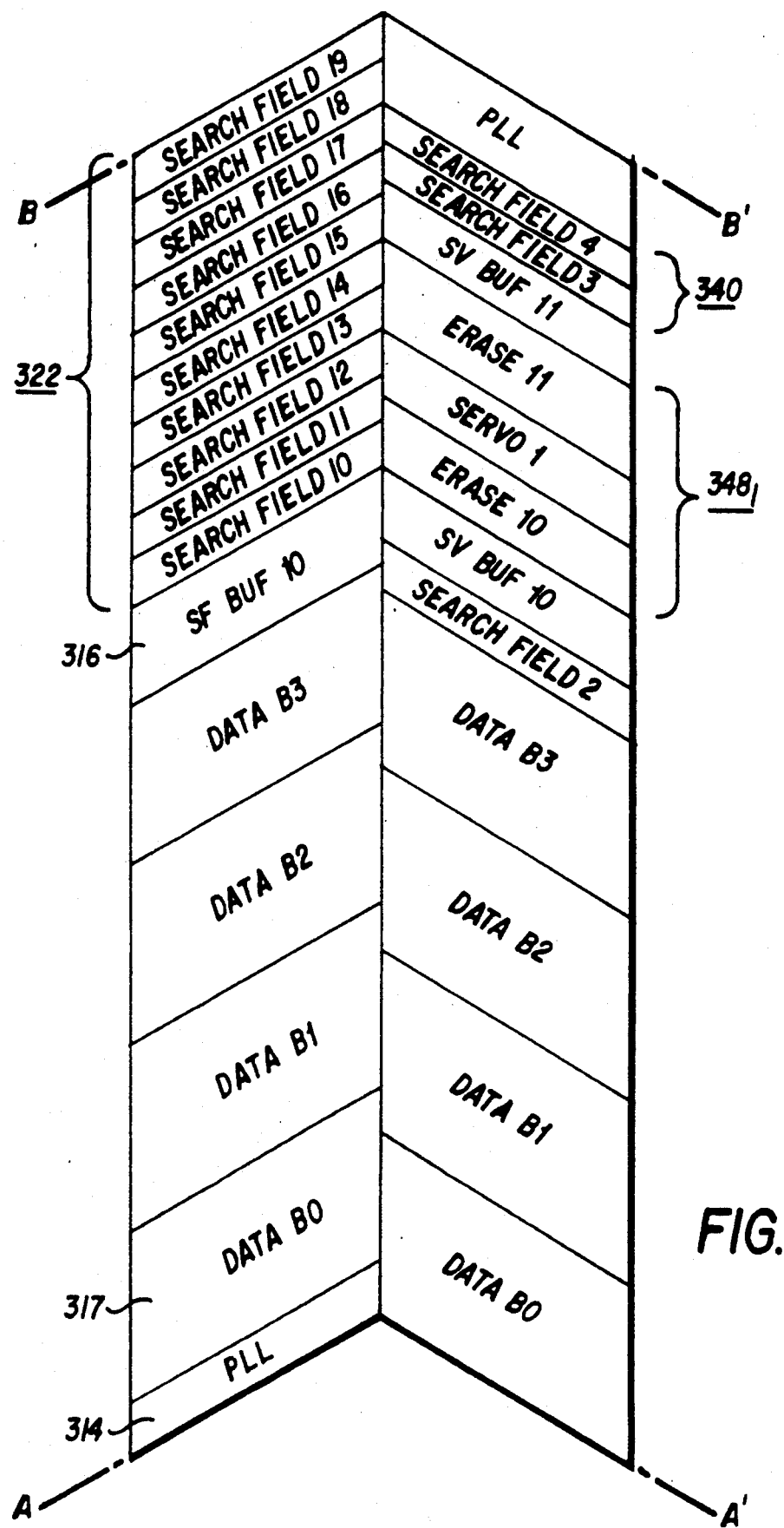
FIG. 7 is a schematic view depicting the format of Track 1 and Track 2 of a magnetic tape recorded by or readable by the helical scan system of the embodiment of FIG. 1.
Figure 7C:
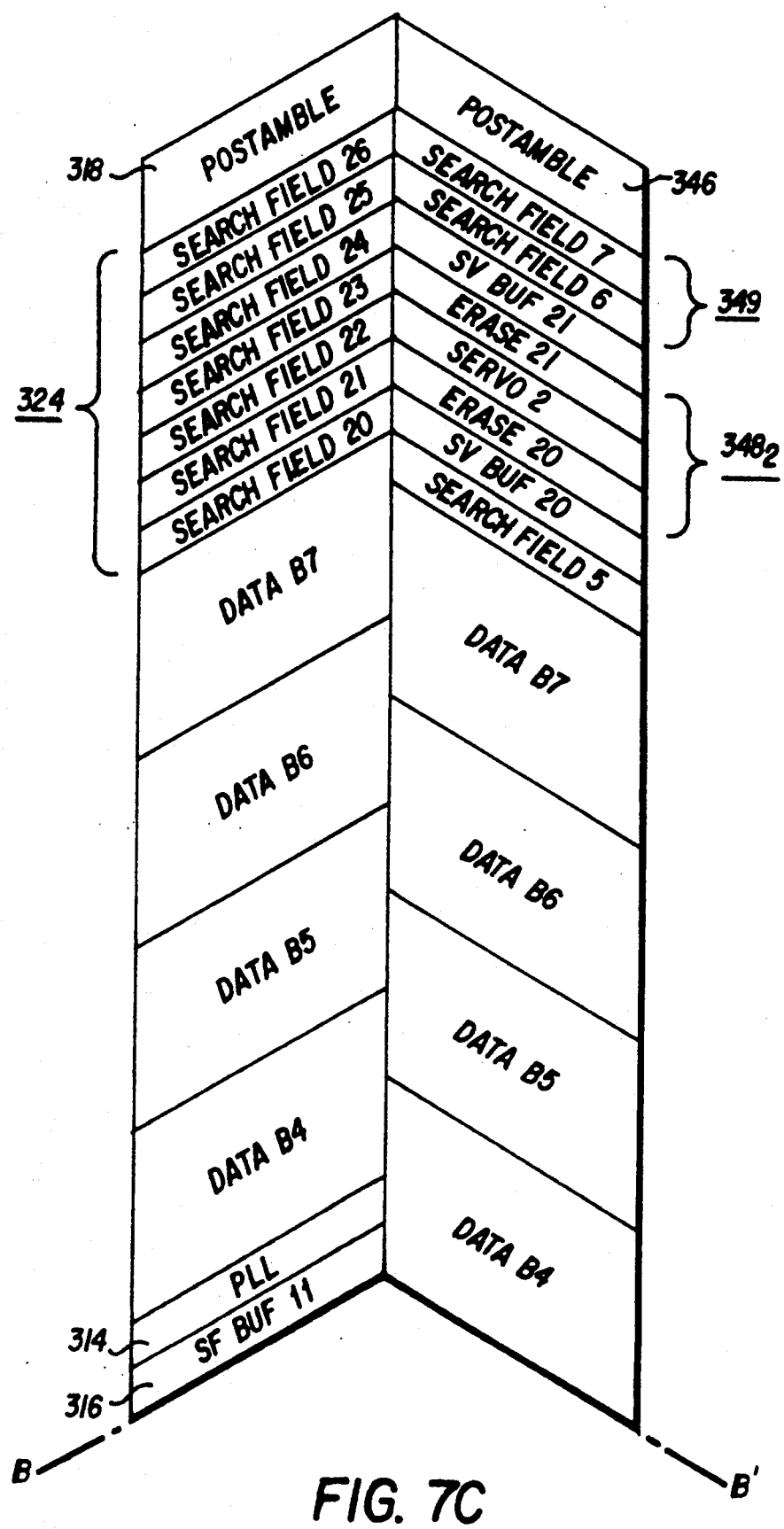

As indicated above, any helical stripe written by write head W1 or read by read head R1 is referred to as "Track 1". As shown in FIG. 7, Track 1 begins with a Preamble field 310 and further includes a plurality of search fields 312; a plurality of data phase lock loop (PLL) fields 314; a plurality of search field buffers 316; a plurality of data blocks 317; and, a postamble 318. These fields are arranged in the following order (as reflected in FIG. 7): Preamble 310 a group 320 of ten search fields (SF0-9); a first PLL field 314; four data blocks 317 (blocks B0-B3); a search field buffer 316 (SF BUF 10); a group 322 of ten search fields (SF10-19); a search field buffer 316 (SF BUF 11); a second PLL field 314; four data blocks 317 (blocks B4-B7); a group 324 of seven search fields (SF20-26); and, the postamble 318.

Both Track 1 and Track 2 contain a plurality of search fields (SF) 312 used for high speed search (HSS) of the tape. The search fields 312 are the only data on the tape 32 that are readable during high speed search.

Each search field 312 includes a sync subfield and a data subfield. The sync subfield consists of a 4.27 MHz signal, while the data subfield comprises data signals (28 bytes long). On Track 1 the search fields are organized as a series of alternating subfields. For example, in group 320, the sequence is a sync subfield for SF0; a data subfield for SF0; a sync subfield for SF1; a data subfield for SF1; a sync subfield for SF2; a data subfield for SF2; and so forth.

The search field buffers SF BUF consist of 55 consecutive digital "1"s for enabling a voltage controlled oscillator in the read circuits to lock onto data.

Table 4 sets forth physical layout dimensions for Track 1. In Table 4, the length values are in units of micrometers; the time values are in units of microseconds.

TAPE FORMAT: TRACK 2

Any helical stripe written by write head W2 or read by read head R2 is referred to as "Track 2". As shown in FIG. 7, Track 2 is formatted to have the following fields (in the following order): a preamble 328; a first erase field 330 ("ERASE 0"); a first servo tone area (also known as "SERVO 0" or "ST0"); a second erase field 330 ("ERASE 1"); a synchronization field known as SV BUF 01; a group 336 of search fields (SF0-1); a PLL field 314; four data blocks 317 (B0-B3); search field SF2; a synchronization field known as SF BUF 10;

a third erase field ("ERASE 10"); a second servo tone area (also known as "SERVO 1" or "ST1"); a fourth erase field 330 ("ERASE 11"); a synchronization field known as SF BUF 11; a group 340 of two search fields (SF3-4); a PLL field 314; four data blocks (B4-B7); search field SF5; a synchronization field SV BUF 20; a fifth erase field 330 ("ERASE 20"); a third servo tone area (also known as "SERVO 2" or "ST3"); a sixth erase field 330 ("ERASE 21"); synchronization field SV BUF 21; a group 344 of search fields (SF6-7); and, a postamble 346.

The synchronization fields SV BUF consist of 160 consecutive digital "1"s for enabling a voltage controlled oscillator in the read circuits to lock onto data.

As with Track 1, on Track 2 the search fields are organized as a series of alternating subfields. However, in some instances the servo buffers SV BUF fulfill the function of a search field sync subfield, making the sync subfield unnecessary (as in the case of SF0 and SF3, for example).

Table 5 sets forth physical layout dimensions for Track 2. In Table 5, the length values are in units of micrometers; the time values are in units of microseconds.

TAPE FORMAT: SERVO FIELDS

The servo fields 348 are provided only on Track 2 and are read by the servo head S. Each servo field 348 comprises one servo data tone burst (1.42 MHz) surrounded by an erase (margin) tone (4.27 MHz). Each servo field 348 is sandwiched by a preceding and succeeding servo buffer (SV BUF), which happens to be a synchronization field. As shown in FIG. 7 and Table 5, servo field $348_0$ occurs near the beginning of Track 2, servo field $348_1$ occurs near the middle of Track 2; and, servo field $348_2$ occurs near the end of Track 2.

Table 6 shows the precise locations, with reference to the beginning of Track 2, of the servo tone areas $ST_0$, $ST_1$, and $ST_2$ (and their neighboring erase fields 330) included in each servo field 348. In Table 6, the length values (e.g., the cumulative length from the beginning of Track 2) are in units of micrometers; the time values (e.g., cumulative time from the beginning of Track 2) are in units of microseconds.

TAPE FORMAT PHYSICAL AND LOGICAL BLOCKS

Figure 8:
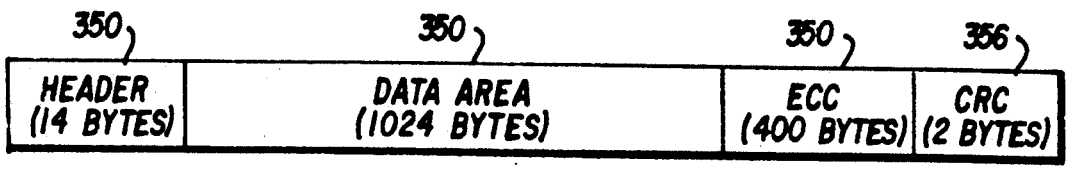
FIG. 8 is a schematic view depicting the format of a physical data block included on a stripe of magnetic tape recorded by or readable by the helical scan system of the embodiment of FIG. 1.

FIG. 8 shows the format of each of the data blocks 317. The format for the data blocks 317 is the same, regardless of whether the data block 317 is written on Track 1 or Track 2. As shown in FIG. 8, each data block 317 (also known as a "physical data block") includes a physical block header 350 (of 14 bytes); a data area 352 (of 1024 bytes); an error correction code ("ECC") area 354 (of 400 bytes); and, a cyclical redundancy check ("CRC") area 356 (of 2 bytes).

FIG. 9 depicts the format of the physical block header 350 of each physical data block 317. The header 350 is used to determine the type of information contained in the block 317, e.g., the block type, and how the information is stored. As indicated above, the header 350 consists of 14 bytes. FIG. 9 shows a hexidecimal byte numbering scheme for the physical block header 350. The four lower order bits of byte 0 of the header 350 contain a value (identifier BLOCK TYPE) which indicates the typing of the block 317. The following hexadecimal values are associated with different block types: "OH" represents user data; "AH" represents a filemark; "CH" represents a logical beginning of tape (LBOT) write with retry; "DH" represents a LBOT write with no retry; "EH" represents a gap; and, "FH" represents end of data.

As indicated above, a BLOCK TYPE value of "OH" signifies that a physical block 317 contains user data. Such a block 317 is referred to as a User Data Block. A User Data Block is a physical block which can contain up to 1024 bytes of user data in the data area 352.

A User Data Block may contain multiple logical blocks of data in the data area 352. The logical blocks of data written to tape 32 are assigned identifier numbers beginning with zero for the first logical block written to tape and increasing by one for each logical block written. The header 350 provides for the identification of one logical block of data within the 1024 byte physical block, in particular the first logical block included in that physical block 317. In addition, the header 350 provides length information for a potential second logical block of data within the 1024 byte physical block. Additional logical blocks are also containable in the data area 352 using a data packing technique.

The physical block header 350 of each physical block 317 includes information for identifying the physical block and for identifying a first of a possible plurality of logical blocks contained in the physical block 317. The least three significant bytes of a twenty five bit BLOCK ID are contained in bytes 1-3 of the header 350, with the most significant bit (BLK HI) being contained in bit 4 of byte 0 of header 350. The BLK HI and BLOCK ID is used to assign a unique identification number to every physical block 317 written to tape. If a block 317 is rewritten to tape, the block identification provided by BLK HI and BLOCK ID does not change.

In like manner as with BLK HI and BLOCK ID, the header 350 includes a twenty five bit physical identification number. In this regard, bytes B, C, and D of the header contain the least significant three bytes of PHYSICAL BLOCK ID; with the most significant bit of the physical identification number being contained in bit 7 of byte 7 ("PHYSHI").

As mentioned above, each physical block header 350 includes information for identifying a first of a possible plurality of logical blocks stored within the physical block 317. The complete four byte first logical block identifier is also stored in a search field 312.

The physical block header 350 of each User Data Block indicates the length of a first logical block and a second logical block included in the physical block 317. The length of the first logical block is a value having its most significant two bits as bits 0 and 1 of byte 4 of the header 350, and its low-order byte as byte 5 of the header 350. Similarly, the length of the second logical block is a value having its most significant two bits as bits 0 and 1 of byte 7 of the header 350, and its low-order byte as byte 8 of the header 350.

The first logical block of a physical block 317 has a START1 and an END1 field provided in the header 350 (bits 3 and 2, respectively, of byte 4). The significance of the START1 and END1 fields is explained by Table 7. The second logical block of a physical block 317 has a START2 and an END2 field provided in the header 350 (bits 3 and 2, respectively, of byte 7). The significance of the START2 and END2 fields is explained by Table 8.

Various other fields in the physical block header 350, located in the positions shown in FIG. 9, serve other purposes. For example, the AUXECC field (byte 0, bit 7) indicates that the information contained in the data area of 8 consecutive blocks contains auxiliary ECC data for the preceding 128 block of data. The INIECC field (byte 0, bit 6) indicates that the 8 consecutive blocks are the first 8 block of a set of 128 blocks for which 8 auxiliary ECC data has been written to the tape. The WRTRTY field (byte 0, bit 5) indicates if this block has been previously written. The LAST2 field (byte 7, bit 4) is set when the second logical block is the last logical block contained in this physical block 17. The CRC field (bytes 9 and A) 356 contains cyclical redundancy check characters for the user data portion of the physical block 317.

As indicated above, for a User Data Block the physical block header 350 provides information regarding a possible first two logical blocks stored in the data area 352. In this respect, a first logical block identifier is provided, as are values for the lengths of the first and second logical blocks. In addition, the physical block header 350 provides information regarding the mapping of data therein via the fields START1 and END1 described in Table 7, and the fields START2 and END2 described in Table 8.

A User Data Block can contain more than two logical blocks through a packing technique. In accordance with the packing technique, the third and subsequent logical blocks in a data area 352 of the physical block 317 have a corresponding logical block header 360 in the data area 352. A logical block header 360 immediately precedes the logical block with which it is associated.

FIG. 10 depicts the format of a logical block header 360. The field LBLK# LSB (byte 0, bits 5,4) contain the two least significant bits of the logical block number of the logical block described by this logical block header 360. A value indicating the length of the logical block described by this logical block header 360 has its two most significant bits in byte 0, bits 1,0, and its least significant byte in byte 1. As shown in Table 9, when the bit of field LAST (byte 0, bit 3) is set, this logical block is the last logical block in this physical block. As also shown in Table 9, when the bit of field END (BYTE 0, BIT 2) is set, the logical block described by this logical block header 360 ends in this physical block.

TABLE 9

| THIRD AND SUBSEQUENT LOGICAL BLOCKS | | |
|---|---|---|
| LAST | END | Meaning |
| 0 | 0 | Invalid |
| 0 | 1 | This logical block ends in this physical block and its is not the last logical block in this physical block. |
| 1 | 0 | This logical block is the last one in this physical block and it extends into the next physical block. |
| 1 | 1 | This logical block is the last one in this physical block and it ends in this physical block. |

The preceding discussion concerning logical blocks provided in a physical block 317 pertains to physical blocks that are User Data Blocks, i.e., physical blocks that have a "0H" value stored in the BLOCK TYPE field of the physical block header 350. The reader should recall that other types of physical blocks 317 are also written on the tape 32, including Filemark blocks, LBOT blocks, Gap Blocks, and an End of Data Block. Each of these blocks have the format of FIG. 8 and include a physical block header 350, a data area 352, an ECC area 354, and a CRC area 356. The format for the first byte (byte 0) of the physical block header 350 for each of these blocks is the same as that shown in FIG. 9.

The physical data blocks 317 included in the first group 370 of 320 stripes recorded on the tape 32 (shown in FIG. 5) are logical beginning of tape (LBOT) blocks. The physical data blocks 317 included in the last group 380 of 128 stripes recorded on the tape 32 (shown in FIG. 5) are End of Data blocks.

A Gap block is transparent to the user and cannot be accessed. Gap blocks are inserted to complete a pair of tracks when less than 16 data blocks 317 are available at the time recording of the track pair is initiated. A Gap Track consists of eight Gap blocks. A Gap Track is recorded during write operations after the last track containing data blocks, when there are no more data blocks available. Gap Tracks are written where a splice or overwrite operation may occur. At least two Gap Tracks need to be written to allow a splice operation. The Gap Tracks are not overwritten when appending data. One to three additional Gap Tracks are written prior to appending data.

A filemark consists of two tracks wherein the physical blocks 317 are Filemark blocks. All sixteen of the file mark physical headers 350 contain the same data except for the physical block identifier. The filemark is preceded by at least two Gap Tracks to allow a file append operation, and is followed by at least two Gap Tracks to allow a splice operation immediately following a filemark.

TAPE FORMAT: PHYSICAL DATA SUB-BLOCKS

As shown in FIG. 11, the data area 352 of each physical data block 317 is partitioned into a plurality of physical data sub-blocks $386_1$–$386_{48}$. As shown in FIG. 12, each data sub-block includes a bit synchronization field (BSF) 387; an information segment number (ISN) 388; and, an information segment field (ISF) 389.

The bit synchronization field 387 is a unique finite-length sequence or pattern which can be identified by the pattern detector 143. In the preferred embodiment, a 20 bit sequence is utilized with the sequence being 01111111111111111110. The bit synchronization field 387 provides a reference within the incoming serial bit stream of each data sub-block 386 for initiating decoding of 8/10 RLL information by the RLL De-Modulator 142.

The information segment number 387 which follows each bit synchronization field 386 is a 10-bit RLL sequence that provides a segment identifier for information in the information segment field (ISF) 389 that follows. The information segment field has 30 bytes of 10 bits of information each. There are 48 unique information segment numbers 388, which correspond to the 48 data sub-blocks 386 in each physical data block 317. The foregoing is discussed in greater detail, with examples of the values for the information segment numbers 388, in U.S. Pat. No. 4,835,628, which is incorporated herein by reference.

TAPE FORMAT: SEARCH FIELDS

FIG. 13 depicts the format of a search field 312 written on the stripes of the tape 32. As mentioned previously, the search fields 312 are used for high speed search (HSS) of the tape 32. The search fields 312 are the only data on tape 32 that is readable during high speed search. The locations of search fields 312 are as indicated on FIG. 7.

All search fields on a given track pair contain the same information. That is, search fields in Track 1 which are written by write head W1 contain the same information as the search fields simultaneously written in Track 2 by write head W2. As explained hereinafter, the search fields 312 contain information for locating files and blocks.

As shown in FIG. 13, each search field 312 has stored therein a file number, a physical block identifier, a logical block identifier, and a block identifier. The file number (bytes 05, 06, and 07), used for space file searches, is one number less than the number of file marks written on the tape before the search field.

The physical block identifier written in bytes 0C-0E of a search field 312 is that of the last physical block written before the current stripe pair. As explained before, this physical block identifier comes from bytes B,C, and D of FIG. 9.

The logical block identifier written in bytes 08, 09, 0A, and 0B of search field 312 is the logical block identifier from the physical block header for the physical block identifier described in this search field 312. In this regard, recall from the previous discussion of FIG. 9 that each physical block header 350 includes a logical block identifier for the first logical block on the physical block 317. That logical block identifier has a four byte identifier whose least significant byte is stored in byte 6 of the header 350. The four next most significant bits of the first logical block identifier are stored in bits 4-7 of byte 4 of the header 350.

The block identifier written in bytes 12, 13, 14, and 15 of search field 312 is the block identifier from the physical block header for the physical block identifier described in this search field 312. This block identifier value is obtained from bytes 1-3 of the physical block header 350 (see FIG. 9) for the physical block identifier described in this search field.

Other fields included in the search field 312 are a byte sync field (bytes 00 and 01); a search field (SF) Sync ID (byte 02); a partition number byte (byte 10) which is set to zero; an End of Data Marker (byte 11, bit 7); and cyclic redundancy check ("CRC") characters (bytes 1A and 1B). In the illustrated embodiment, the value stored in the byte sync field is 0111111111111111111110. The value stored in the SF Sync ID field cannot be the byte sync field or any of the Information segment numbers 388.

The End of Data Marker (EODM) in the search field 312 is one bit indicating the end of data in this partition. A search to the end of data will find this region, then back up the tape to logically position the tape to the end of the last valid data written in the partition.

STRUCTURE: ENCODER/FORMATTER

Figure 14:
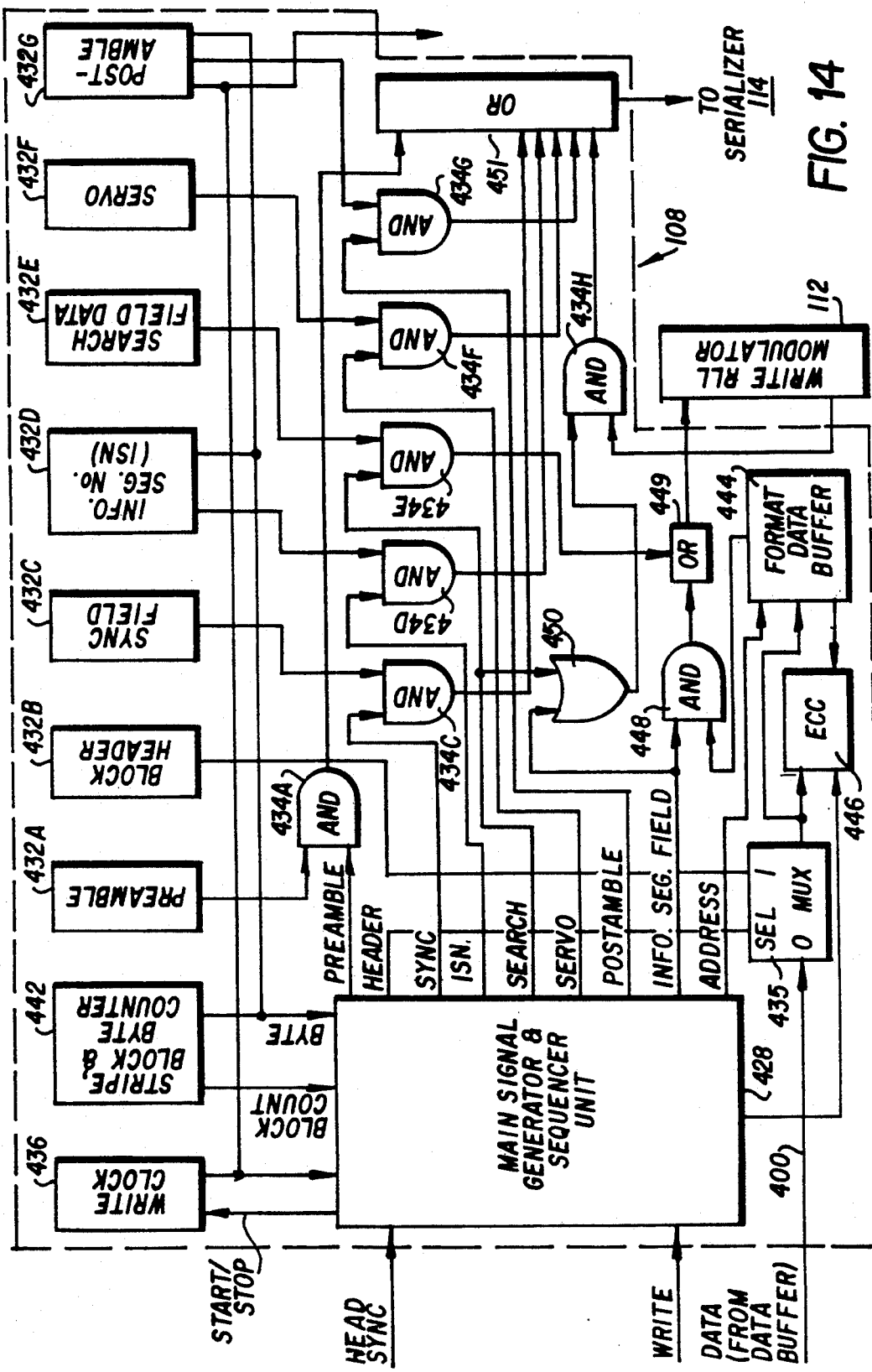
FIG. 14 is a schematic view of an encoder/formatter and an RLL Modulator included in the helical scan system of the embodiment of FIG. 1.

The encoder/formatter 108 and its relationship to the RLL modulator 112 are shown in more detail in FIG. 14. Data from the data buffer manager 106 is applied to the encoder/formatter 108 on line 400. In the encoder/formatter 108 the data is formatted by having combined therewith digital information in response to signals generated by a format signal generating and sequencing unit 428. The format signal generating and sequencing unit 428 receives the HEAD SYNC signal generated by the motion control system 152.

The encoder/formatter 108 includes a series of signal generators 432A through 432G. Generator 432A produces the SSC, CRR, and PRR signals (explained in U.S. Pat. No. 4,835,628) for use in the preamble 310 of Track 1 and preamble 328 of Track 2. Generator 432B produces the data block header 350 which is illustrated in FIG. 9. Generator 432C produces a block synchronization field (BSF). Generator 432D produces information segment numbers 388. Generator 432E produces the search field data for search fields 312. Generator 432F produces the servo fields 348. Generator 432G produces information for the postamble 318 of Track 1 and the postamble 346 of Track 2.

Each of the signal generators 432 which provide the digital information to be combined and formatted with the data from the manager 106. The signal generators 432A, 432C, 432D, 432E, 432F and 432G are connected to provide an input to respective AND gates 434A, 432C, 432D, 434E, 434F, and 434G.

The input data from the data buffer manager 106 is applied on line 400 to a first terminal (terminal 0) of a MUX 435. The block header generator 432B is connected to a second terminal (terminal 1) of the MUX 435. A select pin of the MUX 435 is connected to the sequencer unit 428.

The encoder/formatter 108 includes write clock 436 connected with signal generating and sequencer unit 428 and to various other signal generators 432 as shown. A counter 442 is connected with the generating and sequencing unit 428 for block count, and to unit 428 and to generators 432 for byte count.

Since the signal generating and sequencer unit 428 coordinates the formatting of both Track 1 and Track 2, and since the formats of those tracks differ as described above, the unit 428 must know whether Track 1 or Track 2 is currently being formatted. The unit 428 receives this information in the form of the HEAD SYNC signal produced by the motion control system 152. In this regard, when HEAD SYNC is low (i.e., while read heads R1 and R2 are over the tape) the sequencer unit 428 formats for Track 1. When HEAD SYNC is high, sequencer unit 428 formats for Track 2.

The encoder/formatter 108 also includes a format data buffer 444 and an error correction code (ECC) circuit 446. The data buffer 444 and the ECC circuit 446 are connected to the output of MUX 435 to receive either user informational data from the data buffer of the manager 106 or header information generated by the header signal generator 432B. The format data buffer 444 is also connected to receive address information from the signal generating and sequencing unit 428 and ECC information from ECC circuit 446.

The output of the format data buffer 444 is logically ANDed with information segment field information from the sequencer unit 428 at AND gate 448. The result of the logical AND operation at gate 448 is applied to the a first terminal of OR gate 449. A second terminal of the OR gate 449 is connected to the output terminal of AND gate 434E. The output of OR gate 449 is connected to the RLL Modulator 112, and from thence to a first input terminal of an AND gate 434H.

The sequencer unit 428 is connected to apply sequencing signals to the AND gates 434A, 434C, 434D, 434E, 434F, 434G, and 448. In addition, the sequencing unit 428 is connected to apply SEARCH and INFORMATION SEGMENT FIELD sequencing signals to two input pins of a logical gate 450. The gate 450 has its output pin connected to an input pin of the AND gate 434H.

The encoder/formatter 108 also includes an OR gate 451 to which output pins of the AND gates 434 associated with the signal generators 432 are connected. The output of the AND gate 434H is also connect to the OR gate 451. The AND gates 434, 434H and the OR gate 451 thus serve a multiplexing function. The output terminal of the OR gate 451 is connected to serializer 114 shown in FIG. 4.

STRUCTURE: DECODER/DE-FORMATTER

Figure 17:
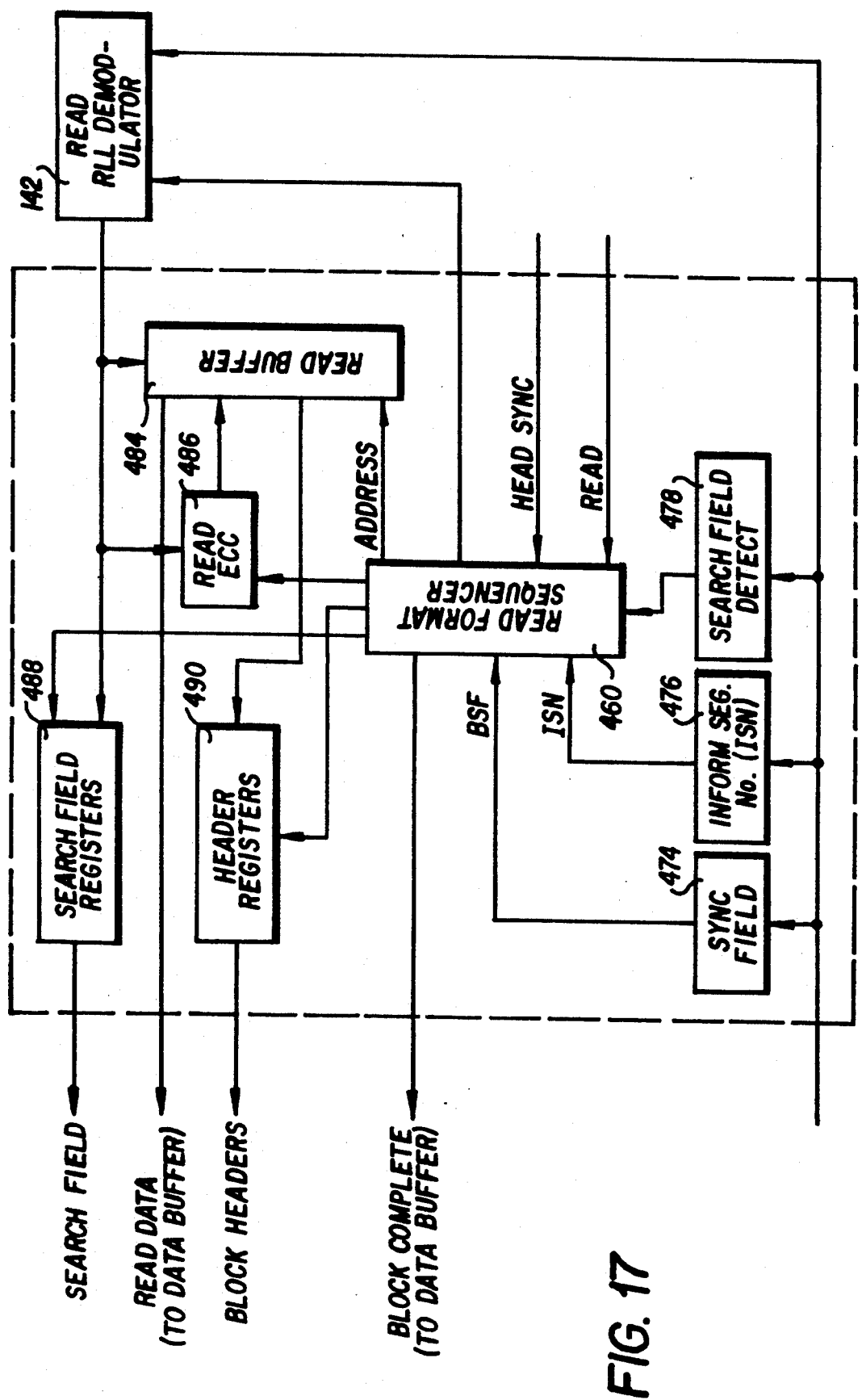
FIG. 17 is a schematic view of an decoder/deformatter and an RLL Modulator included in the helical scan system of the embodiment of FIG. 1.

FIG. 17 shows the decoder/de-formatter 110, together with the RLL De-Modulator 142. The decoder/deformatter 110 includes read formatter sequencer 460 that sequences the de-formatting and de-coding operations. The read formatter sequencer 460 receives a read request signal from the buffer manager 106 and the HEAD SYNC signal from the HEAD SYNC generator 164.

The decoder/de-formatter 110 also includes a plurality of comparators and detectors connected to receive data from the serial-to-parallel converter 140. These include a synchronization field comparator 474; an information segment number (ISN) comparator 476; and, a search field detector 478. Each of these detectors/comparators are connected to the read format sequencer 460 to indicate when their respective fields or values are sensed.

The decoder/de-formatter 110 also includes a read buffer 484 and a read error correction circuit 486, both of which are connected to receive data from the RLL De-Modulator 142. The decoder/de-formatter 110 further includes search field registers 488 and header registers 490. The read formatter sequencer 460 is connected to the RLL De-Modulator 142 to tell De-Modulator 142 when to apply data to the read buffer 484, to the read error correction circuit 486, and to the search field registers 488.

The header registers 490 have data input pins connected to the read buffer 490. In addition, the header registers 490 are connected to the read format sequencer 460 for sequencing the loading of block header data into the registers 490.

The read buffer 484 of the decoder/de-formatter 110 is connected to the data buffer of the data buffer manager 106 to transmit decoded blocks of information to the data buffer manager 106. The read format sequencer 460 applies a BLOCK COMPLETE signal to the data buffer manager 106 when a complete block of data in the read buffer 484 is ready for transmission to the data buffer manager 106. Likewise, the header registers 490 are connected to the data buffer manager 106 for transmitting the header of the completed block to the manager 106 upon generation of the BLOCK COMPLETE signal by the read format sequencer 460.

OPERATION: TRACK WRITING

While the tape 32 moves across the drum 36 of the helical scan system 20, the first 180 degrees of each rotation of the drum 36 results in two helical stripes or tracks T1 and T2 being recorded on the tape. Odd numbered helical stripes are written at a first azimuthal angle A1 by write head W1 and even numbered helical stripes are written at a second azimuthal angle A2. In a readback mode occurring during the following 180 degrees of drum rotation, odd numbered helical stripes are read at a first azimuthal angle A1 by write head W1 and even numbered helical stripes are read at a second azimuthal angle A2. The format of each of the tracks T1 and T2 is described in detail above.

As reflected in FIG. 5, at the beginning of the tape 32 the helical scan system 30 records 320 logical beginning of tape (LBOT) stripes 370, the format of which has been discussed above. The system 20 then records a plurality of stripes which predominantly includes stripes containing user data blocks 317. At the end of recording, the system records a plurality of End of Data stripes represented by group 380 in FIG. 5.

The format of the stripes recorded on the tape 32 is determined by the encoder/formatter 108 which is illustrated in FIG. 14. As indicated above, the encoder/formatter 108 combines data from the data buffer manager 106 with digital signals generated by the signal generators 432 to produce a stripe for recording on the tape 32.

The heart of the encoder/formatter 108 is the signal generator and sequencing unit 428. The HEAD SYNC signal applied to the sequencing unit 428 informs the unit 428 whether to format for Track 1 or Track 2. In this regard, when HEAD SYNC is high (i.e., while read heads R1 and R2 are over the tape) the sequencer unit 428 formats for Track 1. When HEAD SYNC is low, sequencer unit 428 formats for Track 2.

The sequencing unit 428 of the encoder/formatter 108 sequences output signals from the generators 432 for combination with the data from the data buffer manager 106 to yield the formats of Track 1 and Track 2 as shown in FIG. 7 and as described above. For example, at the beginning of a stripe the sequencer 428 causes the preamble information generated by generator 432A to be multiplexed to the serializer 114, and from thence ultimately to one of the write heads W1 or W2. In appropriate sequence, the unit 428 multiplexes other information to the serializer 114, such as servo information (from servo generator 432F) or search field data (from search field data generator 432E), for example.

Figures 15A, 15B, 15C, 16:
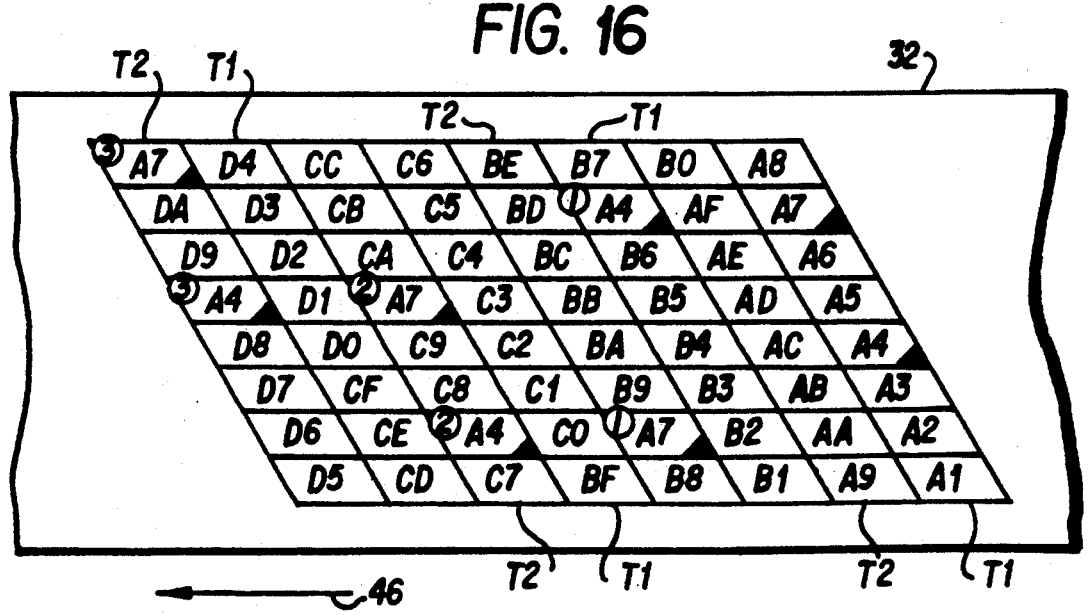
FIGS. 15A, FIG. 15B, and FIG. 15C are schematic views depicting an output queue included in a data buffer manager of the helical scan system of the embodiment of FIG. 1.
FIG. 16 is a schematic view depicting blocks of data recorded and re-recorded on a tape by the helical scan system of FIG. 1.

Turning now to the recording of stripes containing user data blocks 317, the user informational data to be stored in the data blocks 317 is transmitted by the SCSI Interface 104 to the buffer manager 106 where it is temporarily stored in the data buffer. The buffer manager 106 includes an output queue that contains block numbers for the next nineteen (19) blocks to be recorded on tape. FIG. 15A shows the output queue of the buffer manager 106, with the hexidecimal representation of 19 block numbers A1 through B3 being initially contained therein.

While the HEAD SYNC signal is high, i.e., while the read heads R1 and R2 are over the tape 32 and write heads W1 and W2 are not, the encoder/formatter 108 formats Track 1. In formatting Track 1, the encoder/formatter 108 prepares a preamble 310, search fields 312, physical data blocks 317, and other fields for Track 1 as depicted in FIG. 7. For formatting the physical data blocks 317, the encoder/formatter 108 receives the data from the manager 106 for blocks A1 through A8 for inclusion as the eight physical data blocks on Track 1. Encoder/formatter 108 appends the physical block header 350 generated by header generator 432A for each of these physical data block 317, and transmits those physical data blocks to the serializer 114. After being serialized, the physical data blocks are stored in the FIFO 118 until the HEAD SYNC signal goes high.

When the HEAD SYNC signal goes low, the encoder/formatter 108 receives the data blocks A9 through AF shown in the buffer output queue of FIG.

15A and prepares the eight physical data blocks for Track 2 in like manner as was done during the previous 180 degrees for Track 1. After serialization, the data blocks A9 through AF are immediately available for recording. Thus, when the HEAD SYNC signal goes low, both write heads W1 and W2 have blocks available for the simultaneous recording of Track 1 and Track 2, respectively. The blocks for recording by write head W1 on Track T1 come from the FIFO 118; the blocks for recording by write head W2 on Track T2 come from the encoder/formatter 108.

Thus, the encoder/formatter 108 encodes and formats tracks during 360 degrees of the drum 36. During the half of the drum rotation that the write heads W1 and W2 are not over the tape 32, the encoder/formatter 108 prepares Track 1 and stores the formatted track in the FIFO 118. During the 180 degrees of drum rotation that the write heads W1 and W2 are over the tape 32, the encoder/formatter 108 prepares Track 2.

FIG. 16 shows a segment of tape 32 written as a result of the operation of the data buffer manager 106 operating on the output queue of FIG. 15. During the first rotation of drum 36 (while HEAD SYNC is low), blocks A1 through A8 are recorded on the first Track 1 and blocks A9 through B0 are recorded on the first Track 2. After the first rotation of drum 36, the cyclical pointer for the output queue of FIG. 15A has moved from the initial position shown in phantom to the position shown by the solid arrow.

During the first 180 degrees of the second rotation of the drum 36, the read heads R1 and R2 simultaneously read back the blocks that were recorded on Track 1 and Track 2 respectively. For the particular example shown in FIG. 16, the helical scan system 20 determines that all blocks in Tracks 1 and 2 except blocks A4 and A7 were readable, but that the blocks A4 and A7 were written as bad blocks, or were otherwise unreadable. That blocks A4 and A7 were detected to be bad blocks is reflected in FIG. 16 by the solid triangle shown in the corner of the representation for blocks A4 and A7.

For the blocks that were readable upon read back, the data buffer manager 106 fills the queue positions formerly containing the numbers of those blocks with numbers of blocks next awaiting recording. For example, during the first 180 degrees of the second rotation of drum 36, as the manager 106 is informed of the proper readback of each block the manager 106 puts a new block number into the output queue. Just after all the readback signals are received, block numbers B4 through C2 will have been loaded into the output queue as shown in FIG. 15B. However, for blocks A4 and A7 that were recorded or read as bad blocks, the corresponding block numbers remain in their former positions in the output queue for subsequent re-recording.

In the above regard, it is to be noted that the size of the output queue enables the encoder/formatter 108 to always have a jump on the readback operation.

During the first 180 degrees (HEAD SYNC low) of the second rotation of the drum 36, the second pair of Track 1 and Track 2 stripes of FIG. 16 are recorded in accordance with the movement of the pointer through the output queue of FIG. 15B. As shown in FIG. 16, Track 1 includes blocks B1 through B6, rewritten block A4, and block B7. Track 2 of the second pair includes blocks B8, rewritten block A7, and blocks B9 through BE. Thus, during the recording of the second pair of stripes, bad blocks A4 and A7 are rewritten for a first time, as indicated by the circled number "1" shown in the block representations for blocks A4 and A7 in FIG. 16.

Assuming that the first rewrites of blocks A4 and A7 again resulted in the writing of bad blocks, during the next (third) rotation of the drum 36 the block numbers for blocks A4 and A7 remain in their former positions in the output queue as shown in FIG. 15C. Other block numbers for which good readback signals were received are replaced by the next blocks in the data buffer awaiting recording, as shown in FIG. 15C.

During the record cycle (HEAD SYNC low) of the third rotation of the drum 36, the initial position of the queue output pointer is as shown in FIG. 15C. As shown in FIG. 16, during a third pair of stripes T1 and T2 are recorded to include the next sixteen (16) blocks having block numbers stored in the output queue (see FIG. 15C). As shown in FIG. 16, Track 2 contains the second rewrite for the bad blocks A4 and A7. The second rewrites for blocks A4 and A7 also prove to be bad, requiring yet a third rewrite of blocks A4 and A7 during the fourth set of stripes.

As understood with reference to FIG. 15 and FIG. 16 described above, every rewrite of a bad block occurs nineteen block locations after the previous recording of the bad block. By making the distance between copies of the same block a value of nineteen (19), the block is re-recorded at a physical horizontal position on the tape 32 which is spaced away from the previous position so as to avoid any defects extending horizontally on the tape 32. In addition, a given block will eventually alternate between being written by write head W1 and write head W2. The data buffer manager 106 controls the re-writing operation so that the same block will not be written by the same head more than three consecutive times.

Thus, if there is a defect in the tape 32 running in a direction parallel to the edge and one of the heads W1 or W2 is not functioning properly, the helical scan system permits a block of data to be recorded outside the boundaries of the error condition. This minimizes the risk of not being able to write a physical block of data on a defective tape in a broken recorder.

OPERATION: TRACK READING

The read heads R1, R2 read respective tracks T1, T2 while the HEAD SYNC signal is high. In reading the tracks T1, T2, the read heads R1, R2 follow the path shown in FIG. 6.

While the HEAD SYNC signal is high, read heads R1 and R2 simultaneously read their respective tracks T1, T2. The signals from the read heads R1, R2 are amplified by respective amplifiers 132 and 130, and amplified by the circuits 136 and 134, respectively. While HEAD SYNC is high, the signals from read head R1 are fed directly to the serial-to-parallel converter 140, but the signals from the read head R2 are stored in FIFO 138. In this respect, FIFO 138 knows to store the signals from read head R2 during a high HEAD SYNC signal, and to apply the signals stored therein to the serial-to-parallel converter 140 during a low HEAD SYNC signal.

Thus, it is seen that during the 180 degrees of drum rotation that the read heads R1, R2 are over the tape 32, the signals from read head R1 go directly to the serial-to-parallel converter 140, and from thence ultimately to the decoder/de-formatter 110. During the 180 degrees of drum rotation that the read heads R1, R2 are not over the tape 32, the signals from read head R2 are passed from the FIFO 138 to the serial-to-parallel converter 140, and from thence ultimately to the decoder/de-formatter 110.

Data from the serial-to-parallel converter 140 is clocked to the comparators and detectors 474, 476, and 478 comprises the decoder/de-formatter 110. As various signals are sensed and removed by these comparators and detectors and applied to the read format sequencer 460, the read format sequencer 460 generates sequencing signals which are applied to the RLL De-Modulator 142. These sequencing signals enable the RLL De-Modulator 142 to apply demodulated data from the data input stream to the read buffer 484 and the read error correction circuit 486. When the read format sequencer 460 determines that an entire block of data has been received into the read buffer 484 and is ready for transmission to the data buffer manager 106, the read format sequencer 460 sends a BLOCK COMPLETE signal to the manager 106. The block of information is then transmitted to the data buffer of the manager 106 from the read buffer 484 of the decoder/de-formatter 110.

Inasmuch as the helical scan system 30 has the capability of rewritting bad blocks to tape, the decoder/de-formatter 110 may encounter duplicate blocks, i.e, more than one block having the same block number. Any blocks that were rewritten have a WRTRTY bit set in their block reader 350, which is easily identifiable by the decoder/de-formatter 110. When the decoder/de-formatter 110 encounters a block having its WRTRTY bit set, that block is simply discarded if a block having the same number has already been correctly processed by the decoder/de-formatter 110.

While the invention has been particularly shown and described with reference to the preferred embodiments thereof, it will be understood by those skilled in the art that various alterations in form and detail may be made therein without departing from the spirit and scope of the invention.

TABLE 3

| RECORDING AND TAPE PARAMETERS | | |
|---|---|---|
| Parameter | Dual channel | Single channel |
| tape width | 8.00 mm | 8.00 mm |
| tape recording width | 5.351 mm | 6.117 mm |
| track angle | 4.8991 deg | 4.8991 deg |
| tracks per revolution | 2 | 1 |
| track pitch | 15.5 microns | 25.0 microns |
| track width | 15.5 microns | 25.0 microns |
| linear track pitch | 181.523 microns | 363.033 microns |
| track density | 64.506 trk/mm | 32.254 trk/mm |
| linear track density | 5.509 trk/mm | 2.755 trk/mm |
| data clock | 8.55 MHz | 8.55 MHz |
| servo data frequency | 1.425 MHz | 196.875 KHz |
| linear recording density | 2236 ft/mm | 2129 ft/mm |
| areal recording density | 3.66 Mft/sqmm | 1.74 Mft/sqmm |
| front edge margin | 1503 bit cells | 3304 bit cells |
| rear edge margin | 931 bit cells | 3304 bit cells |
| drum speed | 1831.055 rpm | 1922.607 rpm |
| rotor/tape angle | 4.885 deg | 4.885 deg |
| tape wrap angle | 221 deg | 221 deg |
| drum diameter | 40.000 mm | 40.000 mm |
| tape speed | 11.079 mm/sec | 11.633 mm/sec |
| head/tape speed | 3832.913 mm/sec | 4015.109 mm/sec |
| transfer rate | 500.0 KBytes/sec | 262.5 KBytes/sec |

TABLE 4

| TRACK 1 PHYSICAL LAYOUT DIMENSIONS | | | | |
|---|---|---|---|---|
| Item | Length | Bit Cells | Time | Signal |
| PREAMBLE | 489 | 1093 | 128 | 4.27 MHz |
| SFO-9 Sync | 358 | 800 | 94 | 4.27 MHz |
| SFO-9 Data | 1252 | 2800 | 327 | Data |
| Data PLL | 72 | 160 | 19 | 4.27 MHz |
| Data B0 | 7084 | 15840 | 1853 | data |
| Data B1 | 7084 | 15840 | 1853 | data |
| Data B2 | 7084 | 15840 | 1853 | data |
| Data B3 | 7084 | 15840 | 1853 | data |
| SF BUF 10 | 25 | 55 | 6 | 4.27 MHz |
| SF10-19 Sync | 358 | 800 | 94 | 4.27 MHz |
| SF10-19 Data | 1252 | 2800 | 327 | Data |
| SF BUF 11 | 25 | 55 | 6 | 4.27 MHz |
| Data PLL | 72 | 160 | 19 | 4.27 MHz |
| Data B4 | 7084 | 15840 | 1853 | data |
| Data B5 | 7084 | 15840 | 1853 | data |
| Data B6 | 7084 | 15840 | 1853 | data |
| Data B7 | 7084 | 15840 | 1853 | data |
| SF20-26 Sync | 250 | 560 | 65 | 4.27 MHz |
| SF20-26 Data | 877 | 1960 | 299 | Data |
| POSTAMBLE | 948 | 2120 | 248 | 4.27 MHz |

TABLE 5

| TRACK 2 PHYSICAL LAYOUT DIMENSIONS | | | | |
|---|---|---|---|---|
| Item | Length | Bit Cells | Time | Signal |
| PREAMBLE | 672 | 1503 | 176 | 4.27 MHz |
| ERASE 00 | 356 | 797 | 93 | 4.27 MHz |
| ST0 | 356 | 797 | 93 | 1.42 MHz |
| ERASE 01 | 356 | 797 | 93 | 4.27 MHz |
| SV BUF 01 | 72 | 160 | 19 | 4.27 MHz |
| SFO Data | 125 | 280 | 33 | Data |
| SF1 Sync | 36 | 80 | 9 | 4.27 MHz |
| SF1 Data | 125 | 280 | 33 | Data |
| Data PLL | 72 | 160 | 19 | 4.27 MHz |
| Data B0 | 7084 | 15840 | 1853 | Data |
| Data B1 | 7084 | 15840 | 1853 | Data |
| Data B2 | 7084 | 15840 | 1853 | Data |
| Data B3 | 7084 | 15840 | 1853 | Data |
| SF2 Sync | 36 | 80 | 9 | 4.27 MHz |
| SF2 Data | 125 | 280 | 33 | Data |
| SV BUF 10 | 72 | 160 | 19 | 4.27 MHz |
| ERASE 10 | 356 | 797 | 93 | 4.27 MHz |
| ST1 | 356 | 797 | 93 | 1.42 MHz |
| ERASE 11 | 356 | 797 | 93 | 4.27 MHz |
| SV BUF 11 | 72 | 160 | 19 | 4.27 MHz |
| SF3 Data | 125 | 280 | 33 | Data |
| SF4 Sync | 36 | 80 | 9 | 4.27 MHZ |
| SF4 Data | 125 | 280 | 33 | Data |
| Data PLL | 72 | 160 | 19 | 4.27 MHz |
| Data B4 | 7084 | 15840 | 1853 | Data |
| Data B5 | 7084 | 15840 | 1853 | Data |
| Data B6 | 7084 | 15840 | 1853 | Data |
| Data B7 | 7084 | 15840 | 1853 | Data |
| SF5 Sync | 36 | 80 | 9 | 4.27 MHz |
| SF5 Data | 125 | 280 | 33 | Data |
| SV BUF 21 | 72 | 160 | 19 | 4.27 MHz |
| ERASE 20 | 356 | 797 | 93 | 4.27 MHz |
| ST2 | 356 | 797 | 93 | 1.42 MHz |
| ERASE 21 | 356 | 797 | 93 | 4.27 MHz |
| SV BUF 21 | 72 | 160 | 19 | 4.27 MHz |
| SF6 Data | 125 | 280 | 33 | Data |
| SF7 Sync | 36 | 80 | 9 | 4.27 MHz |
| SF7 Data | 125 | 280 | 33 | Data |
| POSTAMBLE | 416 | 931 | 109 | 4.27 MHz |

TABLE 6

| TRACK 2 CUMULATIVE PHYSICAL LAYOUT DIMENSIONS | | | |
|---|---|---|---|
| Item | Length | Bit Cells | Time |
| ERASE 0 | 1028 | 2300 | 269 |
| ST0 | 1384 | 3097 | 362 |
| ERASE 1 | 1740 | 3894 | 455 |
| ERASE 10 | 31095 | 69531 | 8134 |
| ST1 | 31451 | 70328 | 8227 |
| ERASE 11 | 31807 | 71125 | 8320 |

TABLE 6-continued

TRACK 2 CUMULATIVE PHYSICAL LAYOUT DIMENSIONS

| Item | Length | Bit Cells | Time |
| --- | --- | --- | --- |
| ERASE 20 | 61162 | 136762 | 15999 |
| ST2 | 61581 | 137559 | 61518 |
| ERASE 21 | 61874 | 138356 | 61874 |

TABLE 7

FIRST LOGICAL BLOCK

| START1 | END1 | Meaning |
| --- | --- | --- |
| 0 | 0 | There is one logical block in this physical block. It neither starts nor ends in this physical block. |
| 0 | 1 | This logical block started in a previous block and it ends in this physical block. |
| 1 | 0 | A logical block starts in Address 0 of this physical block and ends in a subsequent physical block. |
| 1 | 1 | A logical block starting Address 0 of this physical block and ends in this physical block. |

TABLE 8

SECOND LOGICAL BLOCK

| START2 | END2 | Meaning |
| --- | --- | --- |
| 0 | 0 | No second logical block resides in this physical block. |
| 0 | 1 | Invalid |
| 1 | 0 | A second logical block starts immediately after the first logical block and ends in a subsequent physical block. |
| 1 | 1 | A second logical block starts immediately after the first logical block and ends in this physical block. |

The embodiments of the invention in which an exclusive property or privilege is claimed are defined as follows:

1. Apparatus for recording information on a storage medium in helical stripes, said apparatus comprising:
   means for transporting said storage medium in a direction of medium travel;
   a drum rotatable about an axis which is angularly inclined with respect to said direction of medium travel, said rotatable drum having a peripheral surface which follows a peripheral path, and wherein during a medium contact portion of said peripheral path said peripheral surface is contiguous with said storage medium being transported therepast by said transporting means;
   a set of write heads mounted on said drum peripheral surface for recording a plurality of tracks of information on said storage medium;
   a set of read heads mounted on said drum peripheral surface for reading said plurality of tracks of information written on said storage medium by said set of write heads;
   means for determining whether a block of data written to said storage medium is perceived as being a bad block; and,
   means for controlling said set of write heads and said set of read heads whereby said write heads included in said set of write heads record blocks in helical stripes on said storage medium and whereby said read heads included in said set of read heads read blocks in helical strips on said storage medium, and wherein a block recorded by a first write head in said set and perceived as being a bad block must be rerecorded by a second write head in said set before said bad block is rerecorded a predetermined number of times.

2. A method of recording information on a storage medium in helical stripes, said method comprising:
   transporting said storage medium in a direction of medium travel;
   rotating a drum about an axis which is angularly inclined with respect to said direction of medium travel, whereby a peripheral surface of said drum which follows a peripheral path, and wherein during a medium contact portion of said peripheral path said peripheral surface is contiguous with said storage medium being transported therepast by said transporting means;
   controlling a set of write heads mounted on a peripheral surface of said drum and a set of read heads mounted on said peripheral surface of said drum whereby said plurality of write heads record helical stripes on said storage medium and whereby said plurality of read heads read helical stripes on said storage medium, said helical stripes comprising blocks of information;
   determining whether a block of data recorded on said storage medium is perceived as being a bad block; and,
   rerecording said block perceived as having been recorded as a bad block and causing a write head in said set, other than the write head that initially recorded the block as a perceived bad block, to rerecord said bad block before said bad block is rerecorded a predetermined number of times.

3. Apparatus for recording information on a storage medium in helical stripes, said apparatus comprising:
   means for transporting said storage medium in a direction of medium travel;
   a rotatable drum having a portion of a peripheral surface thereof contiguous with said storage medium as said storage means is transported therepast by said transporting means, said rotatable drum being rotatable about an axis which is angularly inclined with respect to said direction of medium travel;
   two write heads positioned in a first neighborhood of said drum peripheral surface for simultaneously recording two stripes on said storage medium during a first portion of a revolution of said drum;
   two read heads positioned in a second neighborhood of said drum peripheral surface for simultaneously reading two simultaneously-recorded strips on said storage medium during a second portion of said revolution of said drum;
   means for determining when said write heads are proximate said storage medium during said first portion of the revolution of said drum and when said read heads are proximate said storage medium during said first portion of the revolution of said drum for enabling said recording and said reading in a manner whereby information recorded by said write heads during said first portion of the revolution of said drum are essentially immediately read back by said read heads during a second portion of the same revolution of said drum, whereby both of said stripes are both written and then read during the same revolution before further stripes are written and read during a subsequent revolution;

data encoder means which decodes data for recording by a first of said write heads during a second portion of the revolution of said drum and which encodes data for recording by a second of said write heads during a first portion of the revolution of said drum, wherein said data encoder means is a single encoder having an output terminal thereto connected to said second write head and to an input terminal of a register means, an output terminal of said register means being connected to said first write head.

4. The apparatus of claim 3, wherein said register means is connected to said means for determining when said write heads are proximate said storage medium during said first portion of the revolution of said drum, said connection of said register means to said determining means enabling the storing of encoded data in said register means while said read heads are reading said storage medium.

5. The apparatus of claim 3, wherein a center of second neighborhood is spaced away from said a center of said first neighborhood by an angular displacement about said axis of said drum, said angular displacement of said centers of said first and second neighborhoods being on the order of approximately 180 degrees.

6. The apparatus of claim 3, wherein said drum includes a planar reference surface which is orthogonal to said axis about which said drum rotates, and wherein said first read head is axially spaced from said reference surface by a first axial distance, said second read head is axially spaced from said reference surface by a second axial distance which is greater than said first axial distance, said first write head is axially spaced from said reference surface by a third axial distance which is greater than said second axial distance, and said second write head is axially spaced from said reference surface by a fourth axial distance which is greater than said third axial distance.

7. The apparatus of claim 3, wherein said first write head and said first read head are oriented at an azimuthal angle on the order of about +20 degrees, and wherein said second write head and said second read head are oriented at an azimuthal angle on the order of about −10 degrees.

8. The apparatus of claim 3, wherein a servo head is mounted on said drum periphery at a location which is intermediate said first and said second neighborhoods.

9. Apparatus for recording information on a storage medium in helical stripes, said apparatus comprising:
means for transporting said storage medium in a direction of medium travel;
a rotatable drum having a portion of a peripheral surface thereof contiguous with said storage medium as said storage means is transported therepast by said transporting means, said rotatable drum being rotatable about an axis which is angularly inclined with respect to said direction of medium travel;
two write heads positioned in a first neighborhood of said drum peripheral surface for simultaneously recording two stripes on said storage medium during a first portion of a revolution of said drum;
two read heads positioned in a second neighborhood of said drum peripheral surface for simultaneously reading two simultaneously-recorded strips on said storage medium during a second portion of said revolution of said drum;
means for determining when said write heads are proximate said storage medium during said first portion of the revolution of said drum and when said read heads are proximate said storage medium during said first portion of the revolution of said drum for enabling said recording and said reading in a manner whereby information recorded by said write heads during said first portion of the revolution of said drum are essentially immediately read back by said read heads during a second portion of the same revolution of said drum, whereby both of said stripes are both written and then read during the same revolution before further stripes are written and read during a subsequent revolution;
data decoder means which decodes data read by a first of said read heads during a first portion of the revolution of said drum and which decodes data read by a second of said read heads during a second portion of the revolution of said drum, wherein said data decoder means is a single decoder having an input terminal thereof connected to said first read head and to an output terminal of a register means, an input terminal of said register means being connected to said second read head.

10. The apparatus of claim 9, wherein said register means is connected to said means for determining when said read heads are proximate said storage medium during said second portion of the revolution of said drum, said connection of said register means to said determining means enabling the storing of encoded data in said register means while said write heads are recording data on said storage medium.

11. Apparatus for recording information on a storage medium in helical stripes, said apparatus comprising:
means for transporting said storage medium in a direction of medium travel;
a rotatable drum having a portion of a peripheral surface thereof contiguous with said storage medium as said storage means is transported therepast by said transporting means, said rotatable drum being rotatable about an axis which is angularly inclined with respect to said direction of medium travel;
two write heads positioned in a first neighborhood of said drum peripheral surface for simultaneously recording two stripes on said storage medium during a first portion of a revolution of said drum;
two read heads positioned in a second neighborhood of said drum peripheral surface for simultaneously reading two simultaneously-recorded strips on said storage medium during a second portion of said revolution of said drum;
means for determining when said write heads are proximate said storage medium during said first portion of the revolution of said drum and when said read heads are proximate said storage medium during said first portion of the revolution of said drum for enabling said recording and said reading in a manner whereby information recorded by said write heads during said first portion of the revolution of said drum are essentially immediately read back by said read heads during a second portion of the same revolution of said drum, whereby both of said stripes are both written and then read during the same revolution before further stripes are written and read during a subsequent revolution;
means for controlling said set of write heads and said set of read heads whereby write heads included in said set of write heads essentially simultaneously write helical stripes on said storage medium during said first portion of a drum revolution and whereby read heads included in said set of read heads essentially simultaneously read helical stripes on said storage medium during a second portion of a drum revolution;

means for generating a head signal that has a first value when said set of read heads are traveling in a medium contact portion of said peripheral path and a second value when said set of write heads are traveling in a medium contact portion of said peripheral path, and wherein said control means is responsive to said head signal for enabling recording by said set of write heads and reading by said set of read heads;

data buffer means for storing data to be written on said storage medium;

formatting means, connected to receive data from said data buffer means, for formatting said stored data in preparation for recording said data on said storage medium, said formatting means also being connected to supply formatted data to said set of write heads;

memory means connected to receive at least some formatted data from said formatting means;

and wherein said control means causes said formatting means to receive and format a first segment of data when said head signal has a first value and to receive and format a second segment of data when said head signal has a second value, wherein said control means causes said formatting means to store said first segment of formatted data in said memory means when said head signal has a first value; and wherein when said head signal has said second value said control means simultaneously causes a first write head to write said first segment of formatted data from said memory means on a first stripe and a second write head to write said second segment of formatted data on a second stripe on said storage medium.

12. The apparatus of claim 11, wherein said formatting means formats said data from said buffer in the form of blocks, wherein said formatting means formats a predetermined number of blocks as said first segment of formatted data and the same predetermined number of blocks as said second segment of formatted data.

13. The apparatus of claim 12, further comprising:
means for determining whether a block of data written to said storage medium is perceived as being a bad block; and,
means for causing the rerecording on said medium of said block perceived as having been written as a bad block.

14. The apparatus of claim 13, wherein said data buffer includes an output queue, wherein block numbers for data blocks awaiting output to said formatting means and thence to said set of write heads are entered into said output queue, and wherein block numbers for blocks perceived as being written as bad blocks on said storage medium are retained in said output queue so that said blocks will be rewritten on said storage medium.

15. The apparatus of claim 14, wherein said blocks are written at row positions on a helical stripe on said storage medium, and wherein said output queue is configured whereby a row position whereat a block that is rewritten is displaced from a previous row position whereat the block was previously written, the degree of displacement being determined to attempt to avoid media defects running in a row direction.

16. The apparatus of claim 15, wherein eights blocks are included in two simultaneously written stripes, and wherein said output queue is configured as a circular queue having nineteen positions.

17. The apparatus of claim 14, wherein said blocks are written at row positions on a helical stripe on said storage medium, and wherein said output queue is configured whereby a block written by a first write head in said set and perceived as being a bad block must be written by a second write head in said set before said bad block is rewritten a predetermined number of times.

18. The apparatus of claim 17, wherein eight blocks are included in two simultaneously written stripes, and wherein said output queue is configured as a circular queue having nineteen positions.

19. A method of recording information on a storage medium in helical stripes, said method comprising:

transporting said storage medium in a direction of medium travel;

rotating a drum about an axis which is angularly inclined with respect to said direction of medium travel, whereby a peripheral surface of said drum follows a peripheral path, and wherein during a medium contact portion of said peripheral path said peripheral surface is contiguous with said storage medium being transported therepast by said transporting means;

simultaneously recording two stripes on said storage medium during a first portion of a revolution of said drum using two write heads positioned in a first neighborhood of said drum peripheral surface;

simultaneously reading said two simultaneously-recorded stripes on said storage medium during a second portion of the same revolution of said drum during which said two stripes were recorded, said simultaneous reading using two read heads positioned in a second neighborhood of said drum peripheral surface;

determining when said write heads are proximate said storage medium during said first portion of the revolution of said drum and when said read heads are proximate said storage medium during said second portion of the same revolution of said drum for enabling said recording and reading, and using the determination to control the heads whereby both of said stripes are both written and then read during the same revolution before further stripes are written and read during a subsequent revolution;

encoding data for recording by a first of said write heads during a second portion of the revolution of said drum and encoding data for recording by a second of said write heads during a first portion of the revolution of said drum, wherein said encoding is accomplished using a single encoder having an output terminal thereto connected to said second write head and to an input terminal of a register means, an output terminal of said register means being connected to said first write head.

20. The method of claim 19, wherein a signal is applied to said register means in accordance with said determination to enable the storing of encoded data in said register means while said read heads are reading said storage medium.

21. A method of recording information on a storage medium in helical stripes, said method comprising:

transporting said storage medium in a direction of medium travel;

rotating a drum about an axis which is angularly inclined with respect to said direction of medium travel, whereby a peripheral surface of said drum follows a peripheral path, and wherein during a medium contact portion of said peripheral path said peripheral surface is contiguous with said storage medium being transported therepast by said transporting means;

simultaneously recording two stripes on said storage medium during a first portion of a revolution of said drum using two write heads positioned in a first neighborhood of said drum peripheral surface;

simultaneously reading said two simultaneously-recorded stripes on said storage medium during a second portion of the same revolution of said drum during which said two stripes were recorded, said simultaneous reading using two read heads positioned in a second neighborhood of said drum peripheral surface;

determining when said write heads are proximate said storage medium during said first portion of the revolution of said drum and when said read heads are proximate said storage medium during said second portion of the same revolution of said drum for enabling said recording and reading, and using the determination to control the heads whereby both of said stripes are both written and then read during the same revolution before further stripes are written and read during a subsequent revolution;

decoding data read by a first of said read heads during a first portion of the revolution of said drum and decoding data read by a second of said read heads during a second portion of the revolution of said drum, wherein said decoding is accomplished using a single decoder having an output terminal connected to said first read head and to an output terminal of a register means, an input terminal of said register means being connected to said second read head.

22. The method of claim 21, wherein a signal is applied to said register means in accordance with said determination to enable the storing of encoded data in said register means while said write heads are recording data on said storage medium.

23. A method of recording information on a storage medium in helical stripes, said method comprising:

transporting said storage medium in a direction of medium travel;

rotating a drum about an axis which is angularly inclined with respect to said direction of medium travel, whereby a peripheral surface of said drum follows a peripheral path, and wherein during a medium contact portion of said peripheral path said peripheral surface is contiguous with said storage medium being transported therepast by said transporting means;

simultaneously recording two stripes on said storage medium during a first portion of a revolution of said drum using two write heads positioned in a first neighborhood of said drum peripheral surface;

simultaneously reading said two simultaneously-recorded stripes on said storage medium during a second portion of the same revolution of said drum during which said two stripes were recorded, said simultaneous reading using two read heads positioned in a second neighborhood of said drum peripheral surface;

determining when said write heads are proximate said storage medium during said first portion of the revolution of said drum and when said read heads are proximate said storage medium during said second portion of the same revolution of said drum for enabling said recording and reading, and using the determination to control the heads whereby both of said stripes are both written and then read during the same revolution before further stripes are written and read during a subsequent revolution;

generating a head signal that has a first value when said read heads are traveling in said medium contact portion of said peripheral path and a second value when said write heads are traveling in said medium contact portion of said peripheral path, and wherein said head signal is used for enabling recording by said write heads and reading by said read heads;

storing data to be written on said storage medium in a data buffer;

formatting said stored data in preparation for recording said data on said storage medium;

formatting a first segment of data and storing said formatted first segment of data in a memory when said head signal has a first value;

formatting a second segment of data when said head signal has a second value;

simultaneously recording said first segment as a first stripe on said storage medium and said second segment as a second stripe on said storage medium when said head signal has said second value;

wherein said formatting includes formatting a predetermined number of blocks as said first segment of formatted data and the same predetermined number of blocks as said second segment of formatted data;

determining whether a block of data written to said storage medium is perceived as being a bad block;

causing the rerecording on said medium of said block perceived as having been written as a bad block;

wherein block numbers for data blocks awaiting output to said formatting means and thence to said set of write heads are entered into an output queue, and wherein block numbers for blocks perceived as being written as bad blocks on said storage medium are retained in said output queue so that said blocks will be rewritten on said storage medium.

24. The method of claim 23, further comprising recording blocks at row positions on a helical stripe on said storage medium, and controlling the rerecording of a block perceived to be a bad block by rerecording said bad block at a row position that is displaced from a previous row position whereat the block was previously written, the degree of displacement being determined to attempt to avoid media defects running in a row direction.

25. The method of claim 24, wherein said blocks are written at row positions on a helical stripe on said storage medium, and a block written by a first write head in said set and perceived as being a bad block must be written by a second write head in said set before said bad block is rewritten a predetermined number of times.

* * * * *